(12) United States Patent
Sakai et al.

(10) Patent No.: US 9,033,095 B2
(45) Date of Patent: May 19, 2015

(54) EXHAUST TREATMENT UNIT, MANUFACTURING METHOD OF EXHAUST TREATMENT UNIT, AND WORK VEHICLE

(71) Applicant: KOMATSU LTD., Tokyo (JP)

(72) Inventors: Takashi Sakai, Hirakata (JP); Takayuki Irie, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/234,806

(22) PCT Filed: Feb. 15, 2013

(86) PCT No.: PCT/JP2013/053721
§ 371 (c)(1),
(2) Date: Jan. 24, 2014

(87) PCT Pub. No.: WO2014/125624
PCT Pub. Date: Aug. 21, 2014

(65) Prior Publication Data
US 2015/0075893 A1   Mar. 19, 2015

(51) Int. Cl.
| B60K 13/04 | (2006.01) |
| E02F 9/08 | (2006.01) |
| B01D 53/56 | (2006.01) |
| B01D 53/94 | (2006.01) |

(52) U.S. Cl.
CPC .............. *E02F 9/0866* (2013.01); *B01D 53/56* (2013.01); *B01D 53/9431* (2013.01)

(58) Field of Classification Search
CPC ...................................................... B60K 13/04
USPC ............................ 180/296, 309; 60/272–324; 903/904–905
See application file for complete search history.

(56) References Cited

U.S. PATENT DOCUMENTS

| 8,191,668 B2 * | 6/2012 | Keane et al. ................... 180/296 |
| 8,381,865 B2 * | 2/2013 | Okada ............................ 180/309 |
| 8,851,224 B2 * | 10/2014 | Hayashi et al. ............... 180/309 |

(Continued)

FOREIGN PATENT DOCUMENTS

| CN | 101809232 A | 8/2010 |
| JP | 2012-2016 A | 1/2012 |
| JP | 2012-2186 A | 1/2012 |

(Continued)

OTHER PUBLICATIONS

The Office Action for the corresponding German application No. 11 2013 000 171.3, issued on Nov. 18, 2014.

(Continued)

*Primary Examiner* — John Walters
*Assistant Examiner* — James Triggs
(74) *Attorney, Agent, or Firm* — Global IP Counselors, LLP

(57) ABSTRACT

An exhaust treatment unit is used to treat an exhaust gas from an engine of the work vehicle. The exhaust treatment unit includes a first exhaust treatment device, a second exhaust treatment device and a first bracket. The first exhaust treatment device and the second exhaust treatment device are attached to the first bracket. The first bracket includes a brim part and a main body part. The main body part has a convex shape downwardly bulged from the brim part. The main body part includes a first support portion and a second support portion. The first support portion directly supports the first exhaust treatment device. The second support portion directly supports the second exhaust treatment device.

20 Claims, 17 Drawing Sheets

(56) References Cited

U.S. PATENT DOCUMENTS 8,875,500 B2 * 11/2014 Bednarz et al. ................ 60/299
2010/0192551 A1 8/2010 Yokota

FOREIGN PATENT DOCUMENTS

| | | |
|---|---|---|
| JP | 2012-97413 A | 5/2012 |
| JP | 2012-215022 A | 11/2012 |
| JP | 2012-219625 A | 11/2012 |
| JP | 2013-11126 A | 1/2013 |

OTHER PUBLICATIONS

International Search Report for the corresponding international application No. PCT/JP2013/053721, issued on May 21, 2013.
The Office Action for the corresponding Chinese application No. 201380002806.8, issued on Jan. 7, 2015.

* cited by examiner

EXHAUST TREATMENT UNIT, MANUFACTURING METHOD OF EXHAUST TREATMENT UNIT, AND WORK VEHICLE

CROSS-REFERENCE TO RELATED APPLICATIONS

This application is a U.S. National stage application of International Application No. PCT/JP2013/053721, filed on Feb. 15, 2013.

BACKGROUND

1. Field of the Invention

The present invention relates to an exhaust treatment unit for treating exhaust gas from an engine of a work vehicle, a manufacturing method of the exhaust treatment unit, and a work vehicle equipped with the exhaust treatment unit 2. Background Information Work vehicles such as a hydraulic excavator are equipped with an exhaust treatment device. The exhaust treatment device is connected to an engine through a connection pipe in order to treat the exhaust gas from the engine. The exhaust treatment device includes a diesel particulate filter (DPF) device and a selective catalytic reduction (SCR) device. The diesel particulate filter device reduces particulates contained in the exhaust gas. The selective catalytic reduction device reduces nitrogen oxide (NOx) contained in the exhaust gas. In some cases, these two exhaust treatment devices are disposed in a single unit for facilitating maintenance, and the unit is installed in a work vehicle. Such unit is referred to as an exhaust treatment unit.

When the exhaust treatment unit is attached to the engine such that the exhaust treatment unit is supported by the engine, such heavy product is designed to be disposed on the upper part of the engine. Therefore, large load for attaching the exhaust treatment unit to the engine acts on a bracket. When enlarged for a reinforcement purpose, the bracket is inevitably increased in its weight.

Therefore, it is preferable to attach the exhaust treatment unit to a support member other than the engine. For example, in Japan Laid-open Patent Application Publication No. JP-2012-097413(A), a table is mounted on an upper frame through support legs. The diesel particulate filter device and the selective catalytic reduction device are disposed on the top surface of the table.

Specifically, the table is mounted on support legs, each of which is composed of many components. The diesel particulate filter device is disposed either directly on the table or on a separately provided mount part disposed on the table. The selective catalytic reduction device is disposed on the separately provided mount part disposed on the table. Alternatively, a hanger bracket is disposed above the table instead of the mount part, and the diesel particulate filter device and the selective catalytic reduction device are hung from the hanger bracket.

In the invention according to Japan Laid-open Patent Application Publication No. JP-2012-097413(A), either the hanger bracket or the mount part, which is separately provided from the table, is provided for fixing the diesel particulate filter device and the selective catalytic reduction device. Therefore, the number of components of the exhaust treatment unit is increased. This causes drawbacks of an increase of manufacturing cost and a time-consuming assembling work.

It is an aim of the present invention to provide an exhaust treatment unit, a manufacturing method of the exhaust treatment unit, and a work vehicle, whereby a diesel particulate filter device and a selective catalytic reduction device can be stably supported with a small number of components.

An exhaust treatment unit according to a first aspect of the present invention is for treating exhaust gas from an engine of a work vehicle, and comprises a first exhaust treatment device, a second exhaust treatment device and a first bracket. The first exhaust treatment device and the second exhaust treatment device are attached to the first bracket. The first bracket includes a brim part and a main body part. The main body part has a convex shape downwardly bulged from the brim part. The main body part includes a first support portion and a second support portion. The first support portion directly supports the first exhaust treatment device. The second support portion directly supports the second exhaust treatment device.

The main body part may include a first attachment portion, which allows a hoist hook to be attached thereto, on a lateral surface thereof.

The main body part may further include a first bulged portion and a second bulged portion. The first bulged portion is bulged further downward than the first support portion in a position located under the first exhaust treatment device except for the first support portion. The second bulged portion is bulged further downward than the second support portion in a position located under the second exhaust treatment device except for the second support portion.

The main body part may further include a rib upwardly protruded between the first bulged portion and the second bulged portion.

The first support portion may be positioned below the second support portion.

The aforementioned exhaust treatment unit further may comprise a relay connection pipe connecting the first exhaust treatment device and the second exhaust treatment device. The relay connection pipe may be disposed above the first exhaust treatment device and the second exhaust treatment device.

The first support portion may include a contact surface fitted to an outer peripheral surface of the first exhaust treatment device. Additionally, the second support portion may include a contact surface fitted to an outer peripheral surface of the second exhaust treatment device.

The first exhaust treatment device and the second exhaust treatment device may have cylindrical shapes. Moreover, the first support portion and the second support portion may have arc-shaped cross-sections.

The aforementioned exhaust treatment unit may further comprise a first U-shaped bolt locking the first exhaust treatment device. And the main body part may further include a second attachment portion to which the first U-shaped bolt is attached and which is provided on the both sides of the first support portion in a direction perpendicular to a center axis of the first exhaust treatment device.

The aforementioned exhaust treatment unit may further include a second U-shaped bolt locking the second exhaust treatment device. And the main body part may further include a third attachment portion to which the second U-shaped bolt is attached and which is provided on the both sides of the second support portion in a direction perpendicular to a center axis of the second exhaust treatment device.

The aforementioned exhaust treatment unit may further include a first reinforcement plate. The first reinforcement plate may contact the second attachment portion on a surface of the main body part, the surface being opposite to the other surface of the main body part where the first exhaust treatment device and the second exhaust treatment device are supported.

The aforementioned exhaust treatment unit may further include a second reinforcement plate. The second reinforcement plate may contact the third attachment portion on a surface of the main body part, the surface being opposite to the other surface of the main body part where the first exhaust treatment device and the second exhaust treatment device are supported.

The first exhaust treatment device may include a connection port downwardly extended in a tubular shape. In addition, the main body part may further include a first hole portion through which the connection port is inserted.

The main body part may further include a second hole portion for dropping a foreign object therethrough in at least either of the first bulged portion and the second bulged portion.

In a plan view, a maximum width of the first bulged portion in a first direction perpendicular to a longitudinal direction of the first exhaust treatment device is greater than a width of the first support portion in the first direction.

A work vehicle according to a second aspect of the present invention includes an engine, a vehicle body frame, a first exhaust treatment device, a second exhaust treatment device, a first bracket and a second bracket. The vehicle body frame includes a plurality of column members and a beam member. The plural column members are mounted upright onto a revolving frame supporting the engine. The beam member is mounted onto the upper ends of the column members. The first exhaust treatment device is configured to treat exhaust gas from the engine. The second exhaust treatment device is configured to treat the exhaust gas from the engine. The first exhaust treatment device and the second exhaust treatment device are attached to the first bracket. The second bracket supports the first bracket. The first bracket includes a brim part and a main body part. The main body part has a convex shape downwardly bulged from the brim part. The main body part includes a first support portion, a second support portion and a fourth attachment portion. The first support portion directly supports the first exhaust treatment device. The second support portion directly supports the second exhaust treatment device. The second bracket is attached to the fourth attachment portion. The second bracket includes a fifth attachment portion and a sixth attachment portion. The first bracket is attached to the fifth attachment portion. The sixth attachment portion is attached to the beam member.

The fifth attachment portion may be positioned below the beam member.

The sixth attachment portion may positioned above the fifth attachment portion.

The main body part may further includes a first attachment portion, which allows a hoist hook to be attached thereto, on a lateral surface thereof. In addition, the first attachment portion may be positioned above the beam member while the first bracket is attached to the second bracket.

The first attachment portion may be positioned above the sixth attachment portion while the first bracket is attached to the second bracket.

The aforementioned work vehicle may further include a third reinforcement plate. The third reinforcement plate is disposed between the fourth attachment portion and the fifth attachment portion on a surface of the main body part, which is opposite to the other surface of the main body part where the first exhaust treatment device and the second exhaust treatment device are supported.

The aforementioned work vehicle may further include a connection pipe connecting the engine and the first exhaust treatment device. In addition, the first exhaust treatment device and the second exhaust treatment device have cylindrical shapes. Furthermore, the connection pipe may extend in parallel to a plane including a center axis of the first exhaust treatment device and a center axis of the second exhaust treatment device.

An exhaust treatment unit according to a third aspect of the present invention is for treating exhaust gas from an engine of a work vehicle, and comprises a first bracket, a first exhaust treatment device and a second exhaust treatment device. The first bracket is formed by means of a first step and a second step. In the first step, a prototype bracket, including a brim part and a main body part, is formed by means of stamping of a single plate member. The main body part has a convex shape downwardly bulged from the brim part, and includes a first support portion and a second support portion. In the second step, a surrounding part of the brim part is cut out from the prototype bracket. The first exhaust treatment device is disposed immediately on the first support portion. The second exhaust treatment device is disposed immediately on the second support portion.

A method of manufacturing an exhaust treatment unit according to a fourth aspect of the present invention includes a first step, a second step, a third step and a fourth step. In the first step, a prototype bracket, including a brim part and a main body part, is formed by means of stamping of a single plate member. The main body part has a convex shape downwardly bulged from the brim part, and includes a first support portion and a second support portion. In the second step, a first bracket is formed by cutting out a surrounding part of the brim part from the prototype bracket. In the third step, the first exhaust treatment device is disposed immediately on the first support portion. In the fourth step, the second exhaust treatment device is disposed immediately on the second support portion.

In the exhaust treatment unit and the work vehicle of the present invention, the first support portion and the second support portion are integrally formed with the first bracket. Therefore, according to the exhaust treatment unit and the work vehicle, the diesel particulate filter device and the selective catalytic reduction device can be stably supported with a small number of components.

DETAILED DESCRIPTION OF EMBODIMENT(S)

Entire Structure

Figure 1:
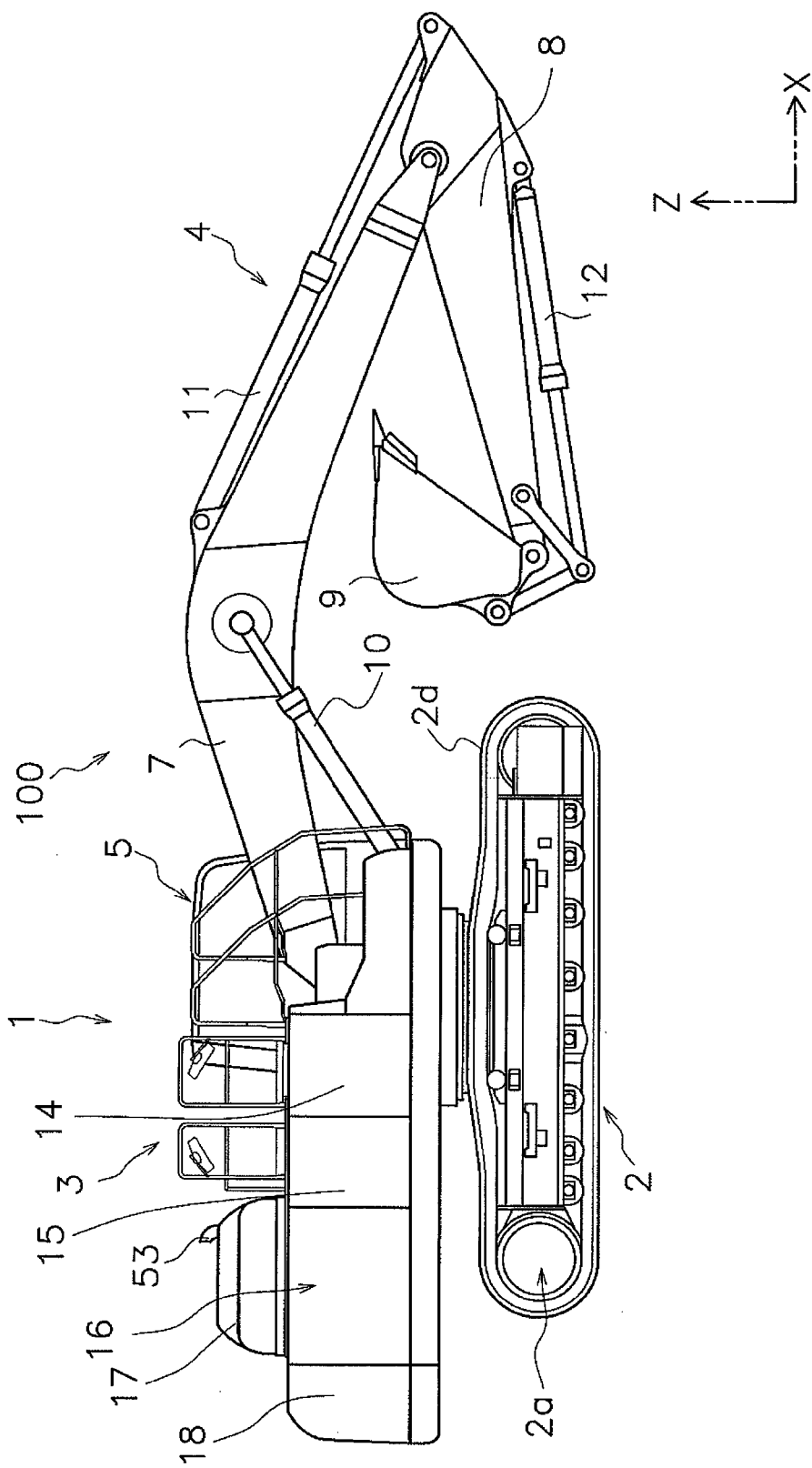
FIG. 1 is a side view of a work vehicle according to an exemplary embodiment of the present invention.
Figure 2:
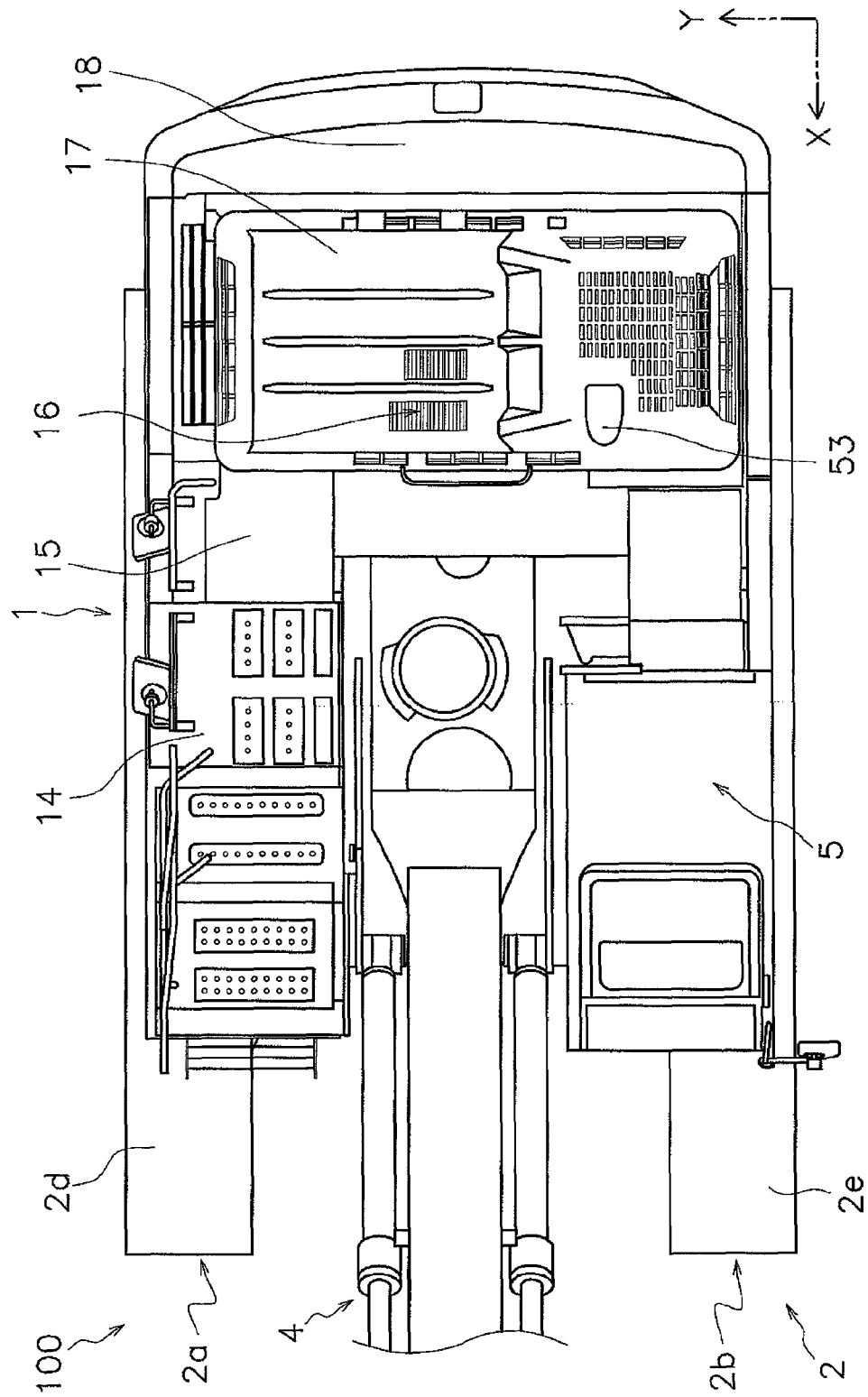
FIG. 2 is a plan view of the work vehicle according to the exemplary embodiment of the present invention.

FIGS. 1 and 2 illustrate a work vehicle 100 according to an exemplary embodiment of the present invention. FIG. 1 is a side view of the work vehicle 100. FIG. 2 is a plan view of the work vehicle 100. In the present exemplary embodiment, explanation will be made by exemplifying a hydraulic excavator as the work vehicle. The work vehicle 100 includes a vehicle main body 1 and a working implement 4.

The vehicle main body 1 includes a travelling unit 2 and a revolving unit 3. The travelling unit 2 includes a pair of drive units 2a and 2b. The drive units 2a and 2b respectively include crawler belts 2d and 2e. The drive units 2a and 2b are configured to drive the crawler belts 2d and 2e by means of driving force from an engine 21 to be described (see FIG. 3) for causing the work vehicle 100 to run. It should be noted that in the following explanation, the term "back-and-forth direction" refers to the back-and-forth direction of the vehicle main body 1. In other words, the term "back-and-forth direction" refers to the back-and-forth direction seen from an operator seated in a cab 5. Further, the term "right-and-left direction" or "lateral direction" refers to the vehicle width direction of the vehicle main body 1. In other words, the right-and-left direction, the vehicle width direction or the lateral direction is the right-and-left direction seen from the aforementioned operator. Further, in the drawings, the back-and-forth direction, the right-and-left direction and an up-and-down direction are represented with an X-axis, a Y-axis and a Z-axis, respectively.

The revolving unit 3 is mounted on the travelling unit 2. The revolving unit 3 is configured to be able to revolve with respect to the travelling unit 2. Further, the revolving unit 3 is provided with the cab 5. The revolving unit 3 includes a fuel tank 14, a hydraulic oil tank 15, an engine compartment 16 and a counterweight 18. The fuel tank 14 stores fuel for driving the engine 21 to be described hereinafter. The fuel tank 14 is disposed in front of the hydraulic oil tank 15. The hydraulic oil tank 15 stores hydraulic oil to be discharged from a hydraulic pump 23 to be described hereinafter (see FIG. 3). The hydraulic oil tank 15 is disposed in alignment with the fuel tank 14 in the back-and-forth direction.

The engine compartment 16 accommodates a variety of devices including the engine 21 and the hydraulic pump 23 as described below. The engine compartment 16 is disposed behind the cab 5, the fuel tank 14 and the hydraulic oil tank 15. The top side of the engine compartment 16 is covered with an engine hood 17. The counterweight 18 is disposed behind the engine compartment 16.

The working implement 4 is attached to the center position on the front part of the revolving unit 3. The working implement 4 includes a boom 7, an arm 8, a bucket 9, a boom cylinder 10, an arm cylinder 11 and a bucket cylinder 12. The base end of the boom 7 is rotatably coupled to the revolving unit 3. On the other hand, the base end of the arm 8 is rotatably coupled to the tip end of the boom 7. The bucket 9 is rotatably coupled to the tip end of the arm 8. The boom cylinder 10, the arm cylinder 11 and the bucket cylinder 12 are hydraulic cylinders configured to be driven by the hydraulic oil discharged from the hydraulic pump 23 to be described hereinafter. The boom cylinder 10 is configured to actuate the boom 7. The arm cylinder 11 is configured to actuate the arm 8. The bucket cylinder 12 is configured to actuate the bucket 9. The working implement 4 is configured to be driven by the driving of the cylinders 10, 11 and 12.

Structure of Engine Compartment

Figure 3:
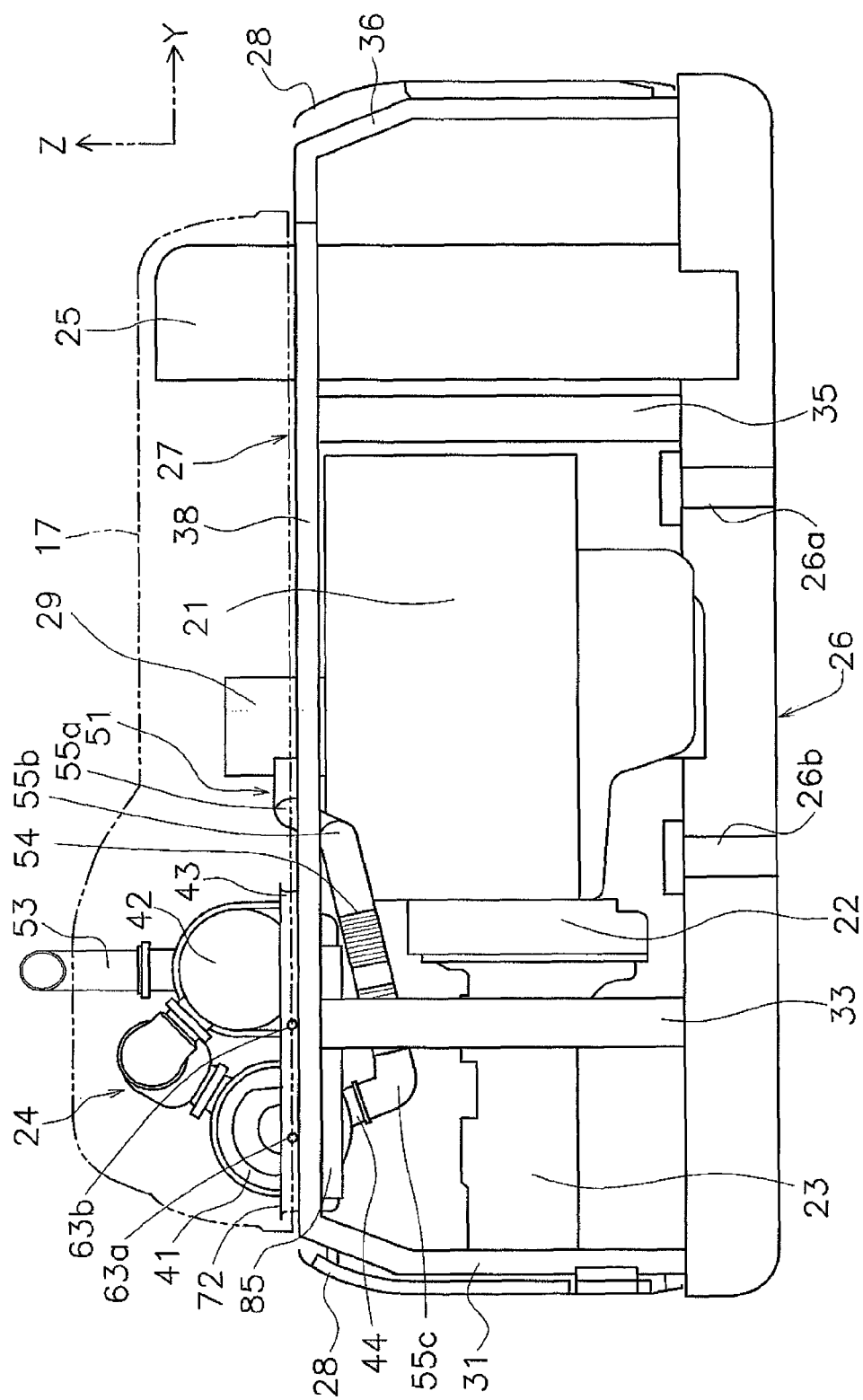
FIG. 3 is a view of an internal structure of an engine compartment seen from rear.

FIG. 3 is a diagram of the internal structure of the engine compartment 16 seen from rear. As illustrated in FIG. 3, the engine 21, a flywheel housing 22, the hydraulic pump 23 and an exhaust treatment unit 24 are disposed in the engine compartment 16. Further, a cooling device 25, including a radiator and an oil cooler, is disposed in the engine compartment 16. The cooling device 25, the engine 21, the flywheel housing 22 and the hydraulic pump 23 are disposed in alignment with each other in the vehicle width direction.

As illustrated in FIG. 3, the work vehicle 100 includes a revolving frame 26 and a vehicle body frame 27. The revolving frame 26 includes a pair of center frames 26a and 26b extending in the back-and-forth direction. The revolving frame 26 supports the engine 21 through rubber dampers.

The vehicle body frame 27 is disposed upright on the revolving frame 26. The vehicle body frame 27 is disposed in the surrounding of a variety of devices such as the engine 21 and the hydraulic pump 23. An exterior cover 28 is attached to the vehicle body frame 27. It should be noted that FIG. 3 illustrates only a part of the exterior cover 28. The engine hood 17 illustrated in FIGS. 1 and 2 is also attached to the vehicle body frame 27.

Figure 4:
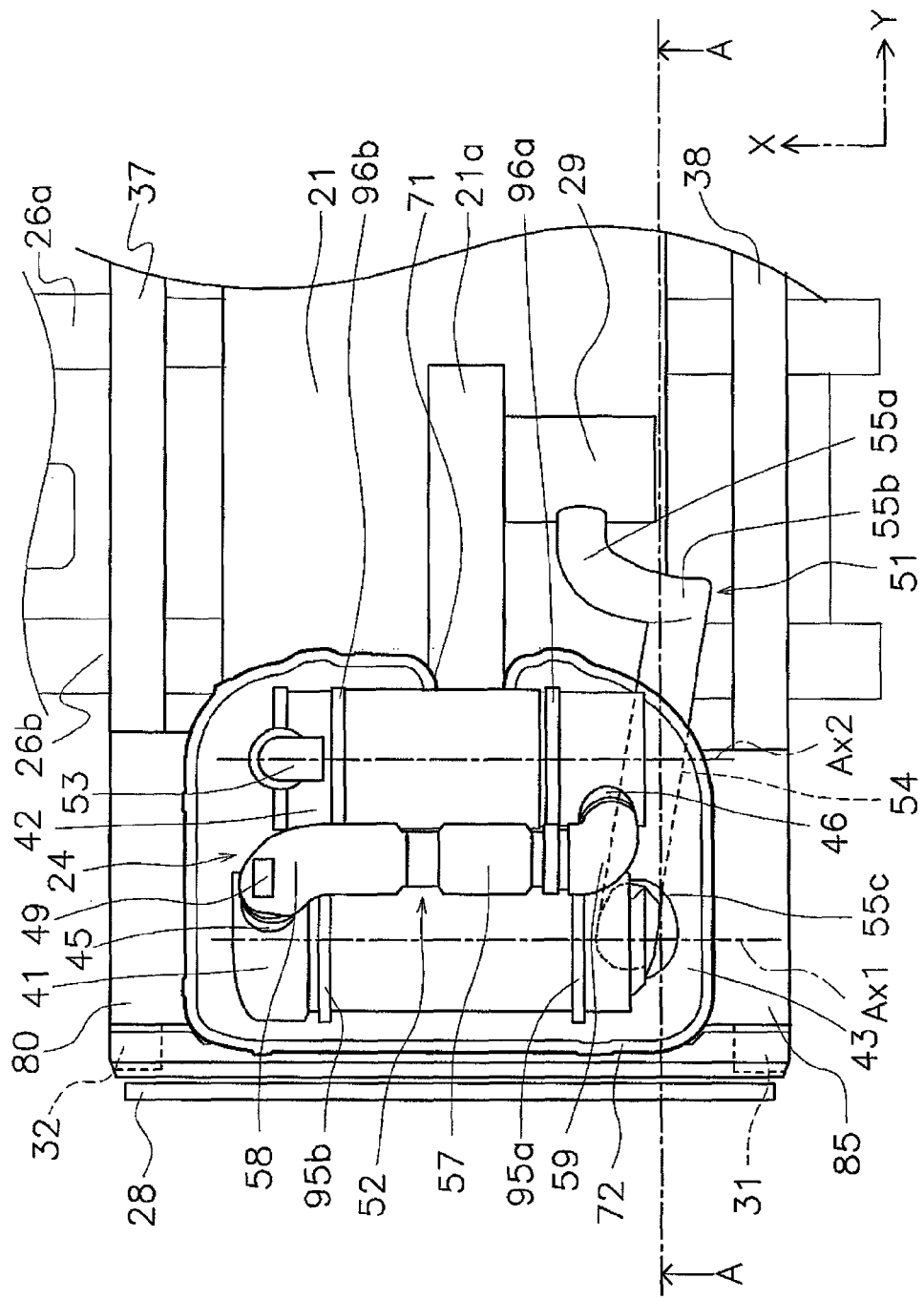
FIG. 4 is a view of a part of the internal structure of the engine compartment seen from above.

FIG. 4 is a diagram of a part of the internal structure of the engine compartment 16 seen from above. As illustrated in FIGS. 3 and 4, the vehicle body frame 27 includes a plurality of column members 31 to 36 (see FIGS. 12 and 13 regarding the column member 34) and a plurality of beam members 37 and 38. The column members 31 to 36 are disposed to extend upwardly from the revolving frame 26. The beam members 37 and 38 are mounted on the upper ends of the column members 31 to 36. The beam members 37 and 38 are supported by the column members 31 to 36. Specifically, as illustrated in FIG. 4, the plural beam members 37 and 38 include the first beam member 37 and the second beam member 38. The first beam member 37 and the second beam member 38 are disposed away from each other in the back-and-forth direction. The first beam member 37 is disposed in front of the engine 21. The second beam member 38 is disposed behind the engine 21.

The hydraulic pump 23 is configured to be driven by the engine 21. As illustrated in FIG. 3, the hydraulic pump 23 is disposed laterally to the engine 21. In other words, the hydraulic pump 23 is disposed in alignment with the engine 21 in the vehicle width direction. The hydraulic pump 23 is disposed at a position lower than the top surface of the engine 21.

The flywheel housing 22 is disposed between the engine 21 and the hydraulic pump 23. The flywheel housing 22 is attached to a lateral surface of the engine 21. On the other hand, the hydraulic pump 23 is attached to a lateral surface of the flywheel housing 22.

Structure of Exhaust Treatment Unit

As illustrated in FIG. 3, the exhaust treatment unit 24 is disposed above the hydraulic pump 23. As illustrated in FIGS. 3 and 4, the exhaust treatment unit 24 includes a first exhaust treatment device 41, a second exhaust treatment device 42, a first bracket 43 and a second connection pipe 52. As illustrated in FIG. 4, the exhaust treatment unit 24 is bridged between the first beam member 37 and the second beam member 38. The exhaust treatment unit 24 is supported by second brackets 80 and 85. The second bracket 80 is fixed to the beam member 37, whereas the second bracket 85 is fixed to the beam member 38. Thus, the first exhaust treatment device 41 and the second exhaust treatment device 42 are supported by the vehicle body frame 27. As illustrated in FIGS. 3 and 4, the first exhaust treatment device 41 and the second exhaust treatment device 42 are disposed in alignment with each other in the vehicle width direction.

In the present exemplary embodiment, the first exhaust treatment device 41 is a diesel particulate filter device, for instance, and is configured to treat the exhaust gas from the engine 21. The first exhaust treatment device 41 is configured to collect particulates contained in the exhaust gas by a filter. The first exhaust treatment device 41 is configured to burn the collected particulates by a heater attached to the filter.

The first exhaust treatment device 41 has a roughly cylindrical contour. As illustrated in FIG. 4, the first exhaust treatment device 41 is disposed such that its center axis Ax1 is arranged along the back-and-forth direction. Therefore, the first exhaust treatment device 41 is disposed such that its center axis Ax1 is arranged perpendicularly to a direction in which the engine 21 and the hydraulic pump 23 are aligned with each other (the direction will be hereinafter referred to as a first direction). In other words, the first exhaust treatment device 41 is disposed such that its longitudinal direction is arranged perpendicularly to the first direction.

In the present exemplary embodiment, the second exhaust treatment device 42 is a selective catalytic reduction device, for instance, and is configured to treat the exhaust gas from the engine 21. The second exhaust treatment device 42 is configured to reduce nitrogen oxide NOx by ammonia to be obtained through the hydrolysis of aqueous urea. The second exhaust treatment device 42 has a roughly cylindrical contour. The second exhaust treatment device 42 is disposed such that its center axis Ax2 is arranged along the back-and-forth direction. Therefore, the second exhaust treatment device 42 is disposed such that its center axis Ax2 is arranged perpendicularly to the first direction. In other words, the second exhaust treatment device 42 is disposed such that its longitudinal direction is arranged perpendicularly to the first direction. Further, the second exhaust treatment device 42 is disposed such that its center axis Ax2 is arranged in parallel to the center axis Ax1 of the first exhaust treatment device 41.

Figure 5:
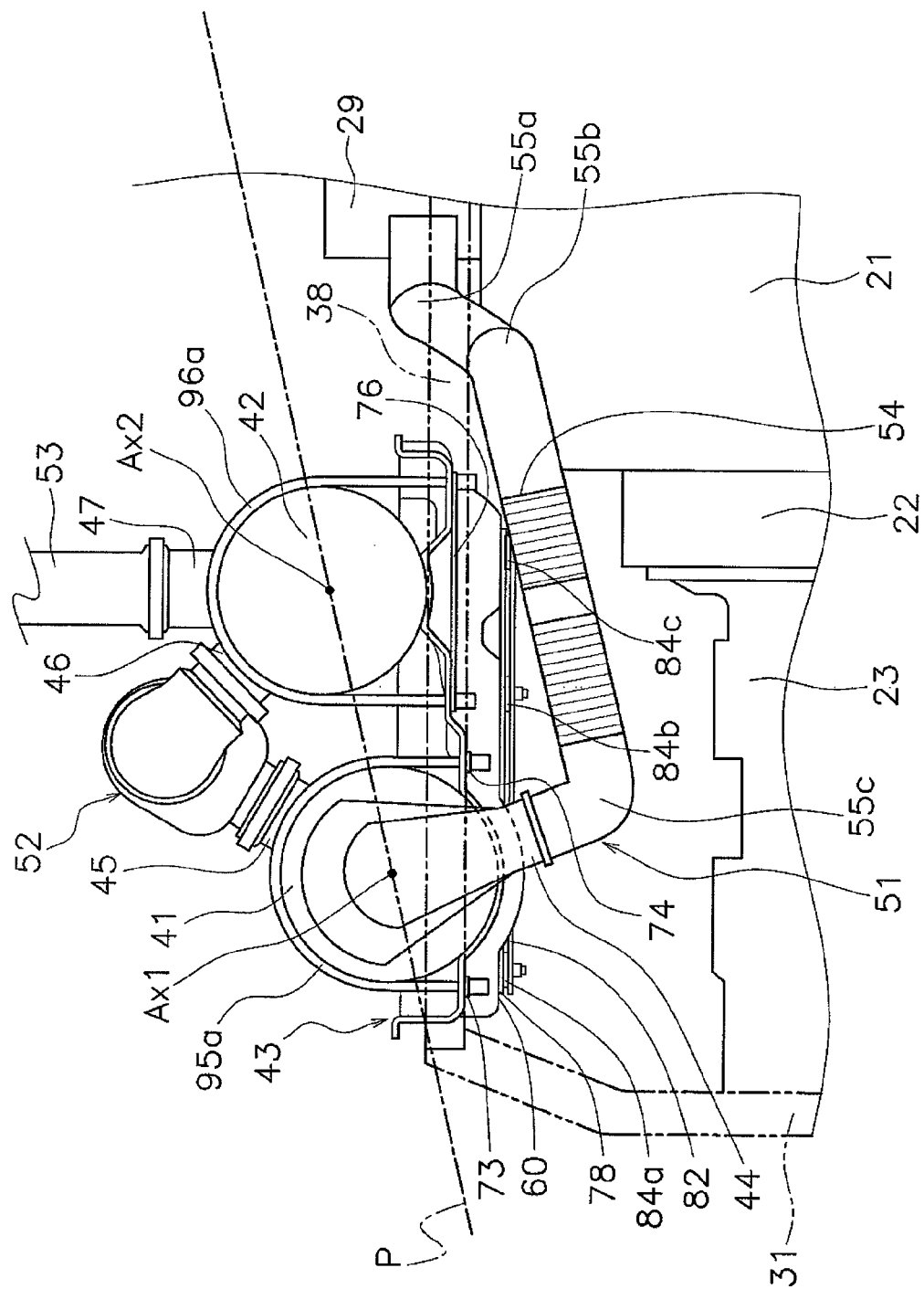
FIG. 5 is an enlarged view of an exhaust treatment unit 24 and the vicinity thereof in FIG. 3.

FIG. 5 is an enlarged view of the exhaust treatment unit 24 and its vicinity in FIG. 3. It should be noted that in FIG. 5, for easy understanding, some components such as the vehicle body frame 27 are not illustrated. Further, for convenience of explanation, FIG. 5 illustrates a cross-sectional view of the first bracket 43 seen along a cross-sectional line A-A in FIG. 4. Moreover, FIG. 5 illustrates the column member 31 and the second beam member 38 with two-dot chain lines.

As illustrated in FIGS. 3 and 5, the first exhaust treatment device 41 and the second exhaust treatment device 42 are disposed above the hydraulic pump 23. As illustrated in FIG. 5, the bottom part of the first exhaust treatment device 41 is positioned below the beam members 37 and 38. As illustrated in FIGS. 3 and 5, the first exhaust treatment device 41 includes a first connection port 44. The first connection port 44 is provided while being downwardly slanted towards the engine 21.

As illustrated in FIGS. 3 and 5, the work vehicle 100 includes a first connection pipe 51. The first connection pipe 51 couples the engine 21 and the first exhaust treatment device 41.

The first connection pipe 51 includes a bellows part 54, a first curved portion 55a, a second curved portion 55b and a third curved portion 55c. As illustrated in FIGS. 3 to 5, the first curved portion 55a couples the second curved portion 55b and the engine 21. In other words, one end of the first connection pipe 51 is connected to an exhaust port of the engine 21 via a supercharger 29. The second curved portion 55b couples the bellows part 54 and the first curved portion 55a. The third curved portion 55c couples the bellows part 54 and the first connection port 44. In other words, the other end of the first connection pipe 51 is connected to the first connection port 44 of the first exhaust treatment device 41.

The bellows part 54 is formed in a corrugated shape and can be expanded and contracted. The bellows part 54 is formed by coupling a plurality of bellows-type expansion and contraction joints. The bellows part 54 is disposed above the hydraulic pump 23. The bellows part 54 is partially positioned under the second exhaust treatment device 42. In other words, the first connection pipe 51 passes under the second exhaust treatment device 42. The bellows part 54 extends from the supercharger 29 towards the first connection port 44 in an obliquely downward direction. More specifically, the straight part of the first connection pipe 51, including the bellows part 54, is slanted along the direction that the first exhaust treatment device 41 and the second exhaust treatment device 42 are aligned with each other. In other words, as illustrated in FIG. 5, the first connection pipe 51 extends so as to be roughly in parallel to a plane P that includes the center axis Ax1 of the first exhaust treatment device 41 and the center axis Ax2 of the second exhaust treatment device 42.

As illustrated in FIGS. 4 and 5, the first exhaust treatment device 41 includes a second connection port 45. The second connection port 45 protrudes obliquely upwards and towards the second exhaust treatment device 42. The second exhaust treatment device 42 includes a third connection port 46. The third connection port 46 is protrudes obliquely upwards and towards the first exhaust treatment device 41.

The exhaust treatment unit 24 includes the second connection pipe 52. One end of the second connection pipe 52 is connected to the second connection port 45 of the first exhaust treatment device 41. The other end of the second connection pipe 52 is connected to the third connection port 46 of the second exhaust treatment device 42. In other words, the second connection pipe 52 is a relay connection pipe for connecting the first exhaust treatment device 41 and the second exhaust treatment device 42. As illustrated in FIGS. 3 and 5, the second connection pipe 52 is disposed above the first exhaust treatment device 41 and the second exhaust treatment device 42. Further, as illustrated in FIG. 4, the second connection pipe 52 is disposed while being overlapped with the first exhaust treatment device 41 and the second exhaust treatment device 42 in a plan view.

As illustrated in FIG. 4, the second connection pipe 52 includes a straight portion 57, a third curved portion 58 and a fourth curved portion 59. The straight portion 57 is positioned over the first exhaust treatment device 41. The third curved portion 58 couples the straight portion 57 and the second connection port 45. The fourth curved portion 59 couples the straight portion 57 and the third connection port 46. An aqueous urea injection device 49 is attached to the third curved portion 58. The aqueous urea injection device 49 is configured to inject aqueous urea into the second connection pipe 52.

As illustrated in FIG. 5, the second exhaust treatment device 42 includes a fourth connection port 47. The fourth connection port 47 protrudes upwards. The work vehicle 100 is provides with an exhaust pipe 53. The exhaust pipe 53 is connected to the fourth connection port 47. As illustrated in FIGS. 1 to 3, the upper part of the exhaust pipe 53 protrudes upwardly protruded from the engine hood 17.

The engine 21, the first connection pipe 51, the first exhaust treatment device 41, the second connection pipe 52, the second exhaust treatment device 42 and the exhaust pipe 53 are connected in series in this sequential order. Therefore, the exhaust gas from the engine 21 is transferred to the first exhaust treatment device 41 via the first connection pipe 51. In the first exhaust treatment device 41, particulates are mostly reduced from the exhaust gas. Next, the exhaust gas is transferred to the second exhaust treatment device 42 via the second connection pipe 52. In the second exhaust treatment device 42, NOx is mostly reduced. Subsequently, the cleaned exhaust gas is discharged to the outside via the exhaust pipe 53.

Structure of First Bracket

The first exhaust treatment device 41 and the second exhaust treatment device 42 are attached to the first bracket 43. As illustrated in FIG. 4, the first exhaust treatment device 41 is fixed to the first bracket 43 by means of first U-shaped bolts 95a and 95b. The second exhaust treatment device 42 is fixed to the first bracket 43 by means of second U-shaped bolts 96a and 96b.

The first bracket 43 is formed by means of stamping of a single member. FIGS. 6 to 9 are a plan view, a bottom view, a front view and a rear view of the first bracket 43, respectively. FIG. 10 is a cross-sectional view of the first bracket 43 seen along a cross-sectional line B-B in FIG. 6. FIG. 11 is a cross-sectional view of the first bracket 43 seen along a cross-sectional line C-C in FIG. 6. It should be noted that FIG. 7 also depicts: reinforcement plates 73 to 77 to be attached to the first bracket 43 in attaching the first U-shaped bolts 95a and 95b and the second U-shaped bolts 96a and 96b to the first bracket 43; and reinforcement plates 78 and 79 to be attached to the first bracket 43 in attaching the first bracket 43 to the second brackets 80 and 85. Further, in FIG. 7, shaded portions indicate contact surfaces between the reinforcement plate 73 to 79 and the first bracket 43 in fixing the reinforcement plates 73 to 79 and the bottom surface of the first bracket 43 by means of bolts and nuts.

Figure 6:
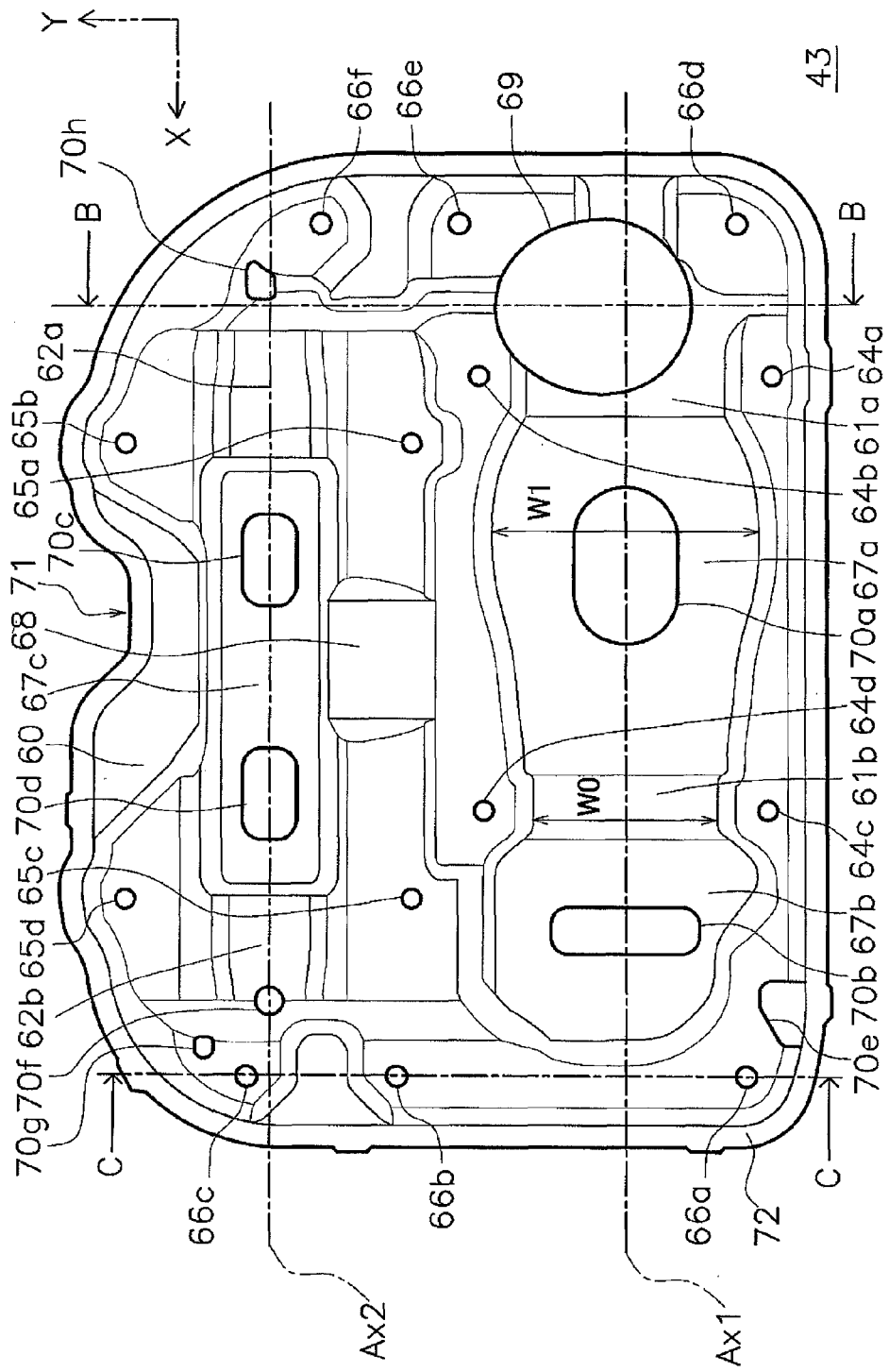
FIG. 6 is a plan view of a first bracket.

As illustrated in FIGS. 6 to 11, the first bracket 43 includes a main body part 60 and a brim part 72. As illustrated in FIGS. 6, 10 and 11, the main body part 60 includes first support portions 61a and 61b, second support portions 62a and 62b, first attachment portions 63a, 63b and 63c, second attachment portions 64a, 64b, 64c and 64d, third attachment portions 65a, 65b, 65c and 65d, fourth attachment portions 66a, 66b, 66c, 66d, 66e and 66f, first bulged portions 67a and 67b, a second bulged portion 67c, a rib 68, a first hole portion 69, second hole portions 70a, 70b, 70c and 70d, a third hole portion 70e, a fourth hole portion 70f and fifth hole portions 70g and 70h. A cut-out portion 71 is included in both of the main body part 60 and the brim part 72.

As illustrated in FIG. 4, the brim part 72 is provided in the surrounding of the first exhaust treatment device 41 and the second exhaust treatment device 42 in a plan view. In more detail, the brim part 72 is provided while enclosing at least three of the front, rear, right and left sides of the first exhaust treatment device 41 and the second exhaust treatment device 42 in a plan view.

As illustrated in FIGS. 8 to 11, the main body part 60 has a convex shape downwardly bulged from the brim part 72. It should be noted that the main body part 60 is positioned above the first connection pipe 51 as illustrated in FIG. 5. Therefore, in detaching the first exhaust treatment device 41, it is possible to avoid interference with the first connection pipe 51.

The first support portions 61a and 61b illustrated in FIGS. 6, 10 and 11 directly support the first exhaust treatment device 41. In other words, the first exhaust treatment device 41 is disposed directly on the first support portions 61a and 61b. The first support portions 61a and 61b include downwardly bulged contact surfaces fitted to the outer peripheral surface of the first exhaust treatment device 41. More specifically, the first exhaust treatment device 41 has a roughly cylindrical contour. Therefore, as illustrated in FIGS. 10 and 11, the cross-sections of the first support portions 61a and 61b are formed in circular-arc shapes. The main body part 60 and the contact surfaces of the first support portions 61a and 61b are both formed in downwardly bulged convex shapes. Therefore, stamping of the main body part 60 and that of the first support portions 61a and 61b can be simultaneously performed.

The second support portions 62a and 62b illustrated in FIGS. 6, 10 and 11 directly support the second exhaust treatment device 42. In other words, the second exhaust treatment device 42 is disposed directly on the second support portions 62a and 62b. The second support portions 62a and 62b include downwardly bulged contact surfaces fitted to the outer peripheral surface of the second exhaust treatment device 42. More specifically, the second exhaust treatment device 42 has a roughly cylindrical contour. Therefore, as illustrated in FIGS. 10 and 11, the cross-sections of the second support portions 62a and 62b are formed in circular-arc shapes. The main body part 60 and contact surfaces of the second support portions 62a and 62b are both formed in downwardly bulged convex shapes. Therefore, stamping of the main body part 60 and that of the second support portions 62a and 62b can be simultaneously performed. It should be noted that as illustrated in FIGS. 10 and 11, the second support portions 62a and 62b are positioned above the first support portions 61a and 61b. In other words, the first support portions 61a and 61b are positioned below the second support portions 62a and 62b.

The first attachment portions 63a, 63b and 63c illustrated in FIGS. 10 and 11 are utilized to attach/detach the exhaust treatment unit 24 to/from the vehicle. Specifically, the attachment/detachment work for the exhaust treatment unit 24 is performed by hoisting the exhaust treatment unit 24 with use of hooks as hoist tools attached to the first attachment portions 63a, 63b and 63c. Therefore, hoist hooks can be attached to the first attachment portions 63a, 63b and 63c. As illustrated in FIGS. 10 and 11, the first attachment portions 63a, 63b and 63c are provided on the lateral surfaces of the main body part 60. As illustrated in FIG. 3, for convenience of attachment/detachment of the hooks as hoist tools, the first attachment portions 63a and 63b are positioned above the beam member 38, while the exhaust treatment unit 24 is attached to the vehicle body frame 27 (i.e., while the first bracket 43 is attached to the second brackets 80 and 85). Likewise, the first attachment portion 63c is also positioned above the beam member 37 (see FIG. 13), while the exhaust treatment unit 24 is attached to the vehicle body frame 27 (i.e., while the first bracket 43 is attached to the second brackets 80 and 85).

As illustrated in FIG. 6, the second attachment portions 64a and 64b are provided on the both sides of the first support portion 61a in a direction perpendicular to the center axis Ax1 of the first exhaust treatment device 41. In other words, the second attachment portions 64a and 64b are provided on the both sides of the first support portion 61a in a direction perpendicular to a straight line connecting the center of a circular arc formed by the first support portion 61a and that of a circular arc formed by the first support portion 61b. Likewise, the second attachment portions 64c and 64d are provided on the both sides of the first support portion 61b in a direction perpendicular to the center axis Ax1 of the first exhaust treatment device 41. In other words, the second attachment portions 64c and 64d are provided on the both sides of the first support portion 61b in a direction perpendicular to a straight line connecting the center of a circular arc formed by the first support portion 61a and that of a circular arc formed by the first support portion 61b.

The second attachment portions 64a to 64d include holes through which the first U-shaped bolts 95a and 95b (see FIG. 4) for locking the first exhaust treatment device 41 are inserted. Each of the first U-shaped bolts 95a and 95b includes screw grooves on the both ends thereof. For example, as illustrated in FIG. 5, the first U-shaped bolts 95a and 95b are fixed to the second attachment portions 64a to 64d on the bottom surface of the first bracket 43, i.e., on the opposite side of where the first exhaust treatment device 41 is supported, through the first reinforcement plates 73 to 75 (see FIG. 7) by means of nuts. Steel materials are used for the first reinforcement plates 73 to 75. As illustrated in FIGS. 10 and 11, the second attachment portions 64a to 64d are positioned above the lowermost surface of the main body part 60. Accordingly, the tip ends of the first U-shaped bolts 95a and 95b are not positioned below the lowermost surface of the main body part 60, even when the first U-shaped bolts 95a and 95b are inserted through the second attachment portions 64a to 64d.

As illustrated in FIG. 6, the third attachment portions 65a and 65b are provided on the both sides of the second support portion 62a in a direction perpendicular to the center axis Ax2 of the second exhaust treatment device 42. In other words, the third attachment portions 65a and 65b are provided on the both sides of the second support portion 62a in a direction perpendicular to a straight line passing through the most recessed part in the center of the second support portion 62a. Likewise, the third attachment portions 65c and 65d are provided on the both sides of the second support portion 62b in a direction perpendicular to the center axis Ax2 of the second exhaust treatment device 42. In other words, the third attachment portions 65c and 65d are provided on the both sides of the second support portion 62b in a direction perpendicular to a straight line passing through the most recessed part in the center of the second support portion 62b.

The third attachment portions 65a to 65d include holes through which the second U-shaped bolts 96a and 96b (see FIG. 4) for locking the second exhaust treatment device 42 are inserted. Each of the second U-shaped bolts 96a and 96b includes screw grooves on the both ends thereof. For example, as illustrated in FIG. 5, the second U-shaped bolts 96a and 96b are fixed to the third attachment portions 65a to 65d on the bottom surface of the first bracket 43, i.e., on the opposite side of where the second exhaust treatment device 42 is supported, through the second reinforcement plates 76 and 77 (see FIG. 7) by means of nuts. Steel materials are used for the second reinforcement plates 76 and 77. As illustrated in FIGS. 10 and 11, the third attachment portions 65a to 65d are positioned above the lowermost surface of the main body part 60. Accordingly, the tip ends of the second U-shaped bolts 96a and 96b are not positioned below the lowermost surface of the main body part 60, even when the second U-shaped bolts 96a and 96b are inserted through the third attachment portions 65a to 65d.

The second brackets 80 and 85 are attached to the fourth attachment portions 66a to 66f illustrated in FIGS. 6 to 9. As depicted with two-dot chain lines in FIGS. 8 and 9, the fourth attachment portions 66a to 66f are positioned on the same plane. Description will be made hereinafter for a method of attaching the first bracket 43 and the second brackets 80 and 85.

Figure 7:
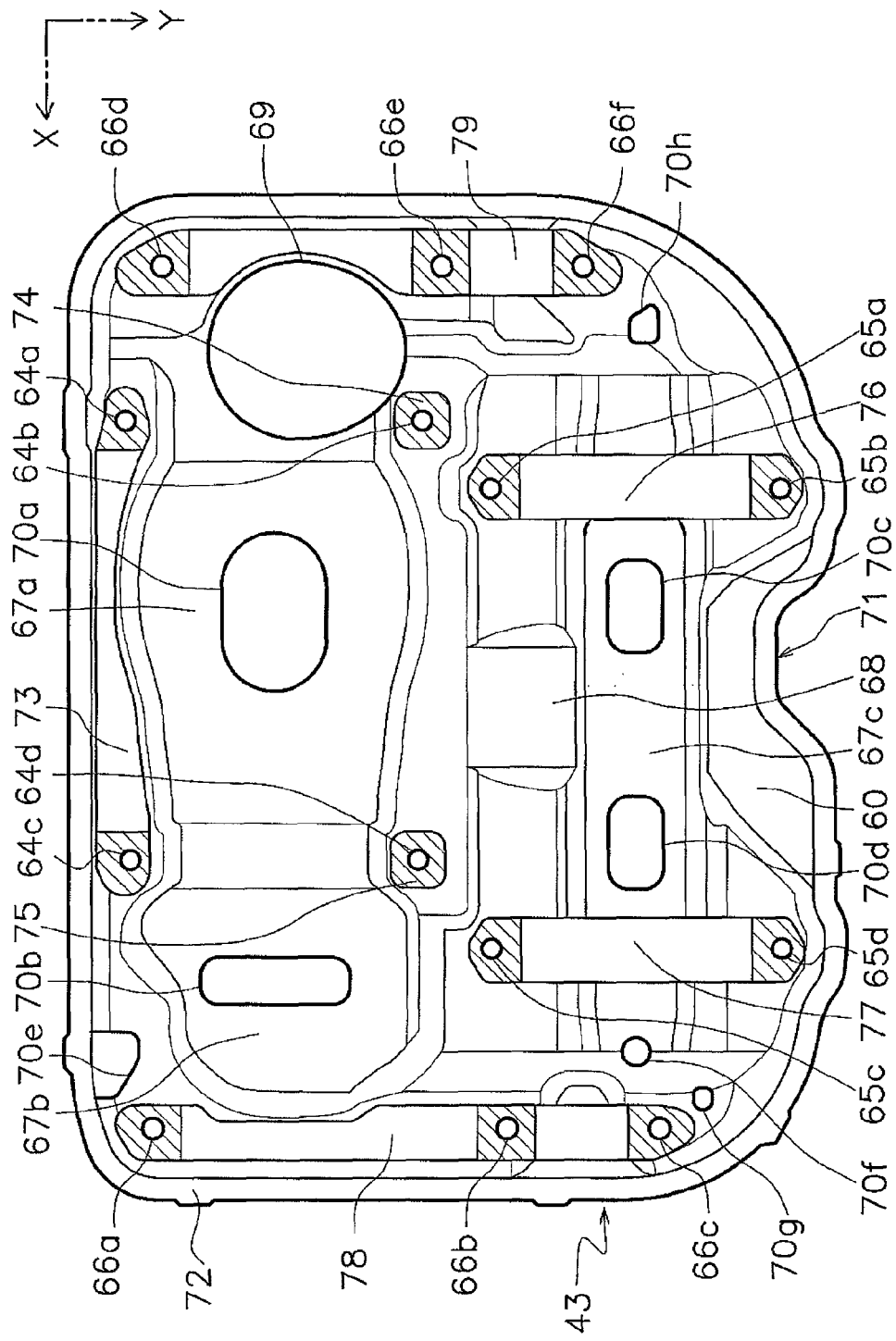
FIG. 7 is a bottom view of the first bracket.
Figure 8:
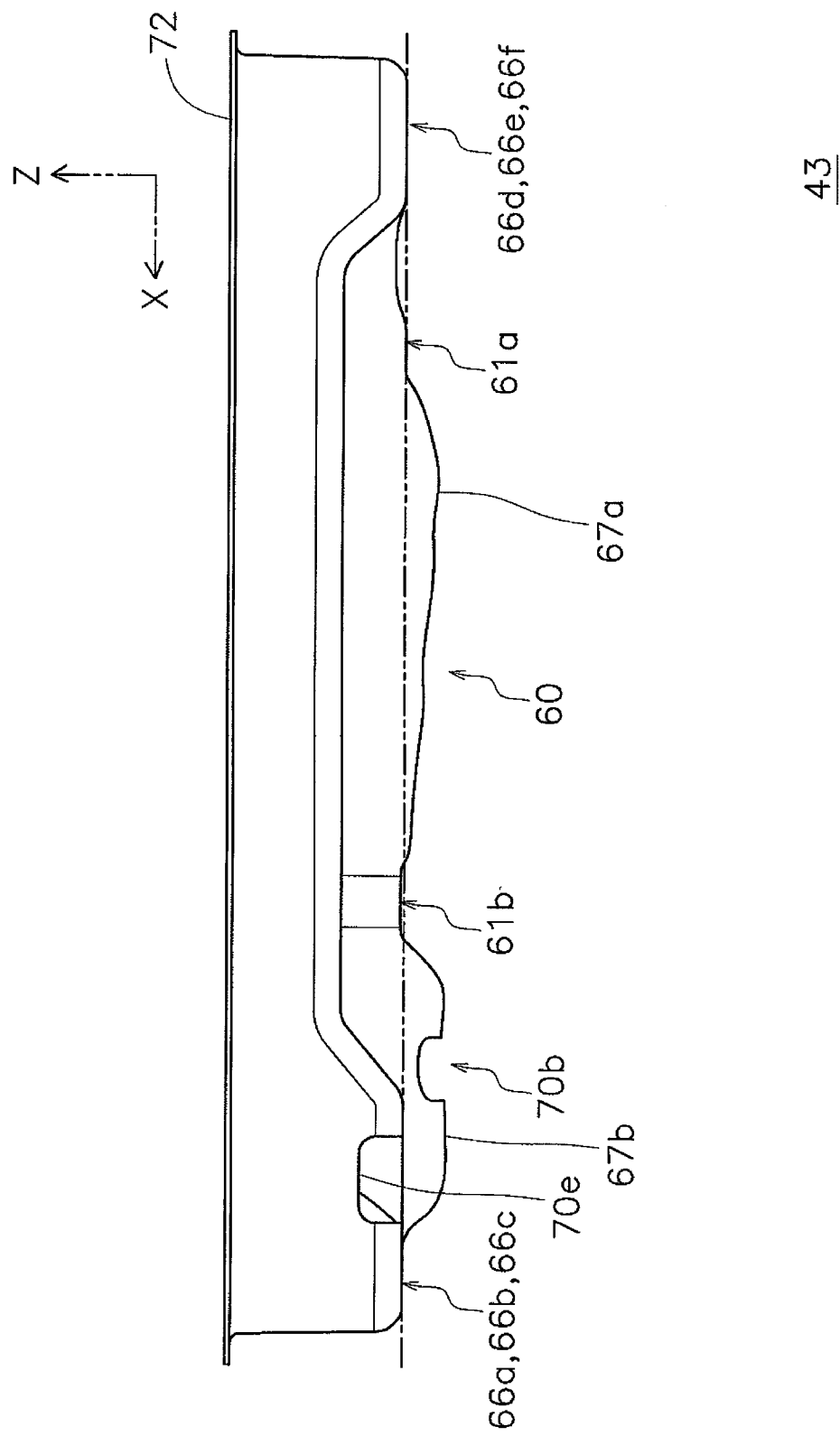
FIG. 8 is a front view of the first bracket.
Figure 9:
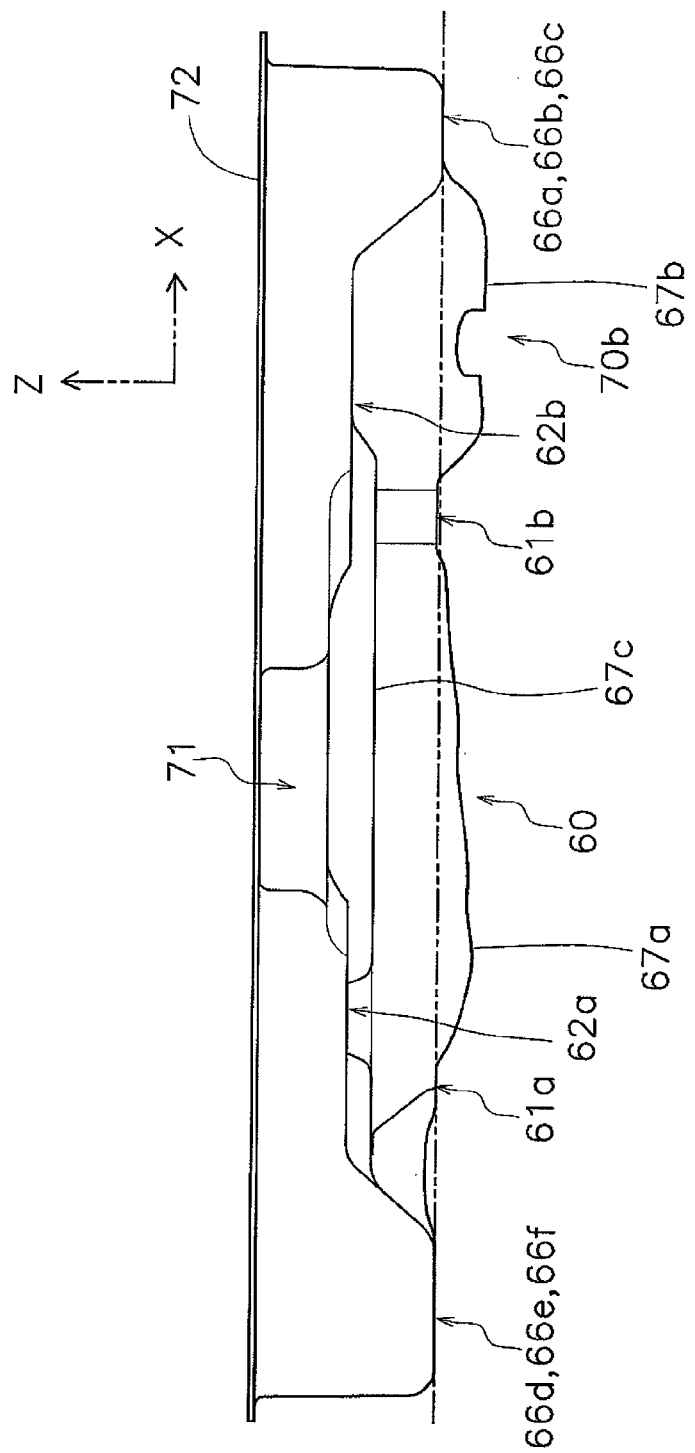
FIG. 9 is a rear view of the first bracket.
Figure 10:
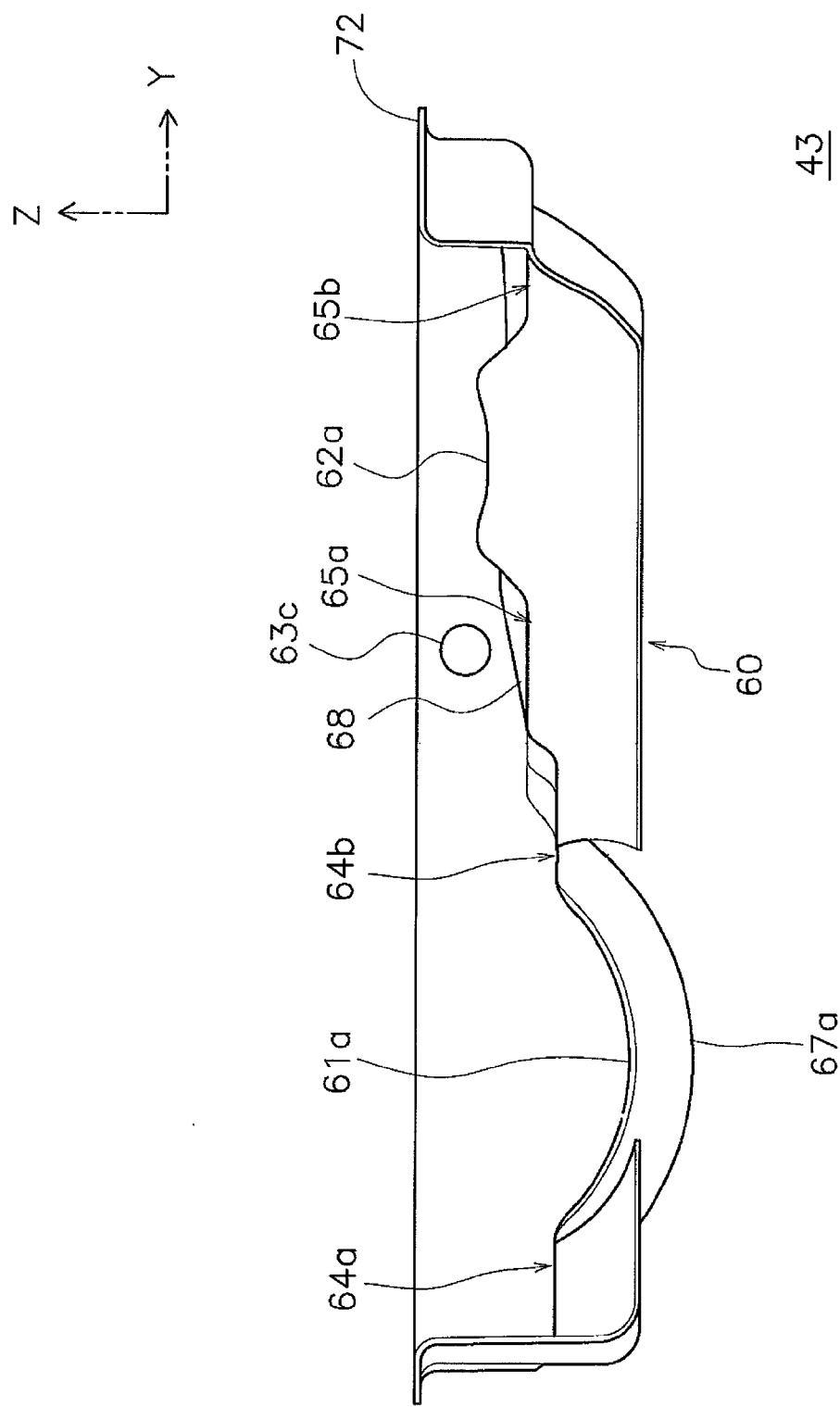
FIG. 10 is a cross-sectional view of the first bracket 43 seen along a cross-sectional line B-B in FIG. 6.
Figure 11:
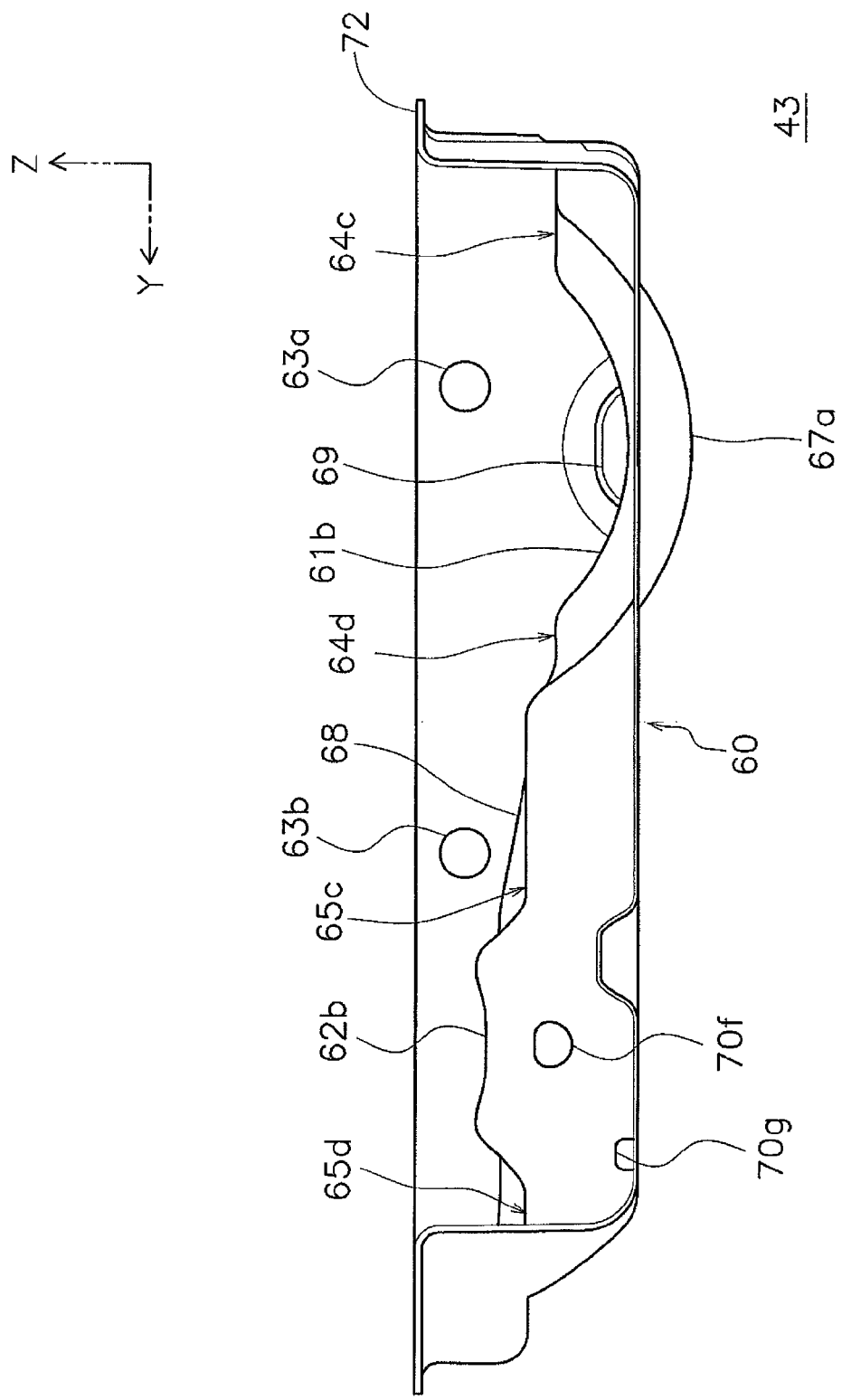
FIG. 11 is a cross-sectional view of the first bracket 43 seen along a cross-sectional line C-C in FIG. 6.

As illustrated in FIGS. 8 and 9, the first bulged portions 67a and 67b illustrated in FIGS. 6 to 11 are further downwardly bulged than the first support portions 61a and 61b in locations positioned under the first exhaust treatment device 41. The first bulged portion 67a is provided between the first support portion 61a and the first support portion 61b. The first bulged portion 67b is provided under an end portion of the first exhaust treatment device 41, i.e., an end portion opposite to the end portion on which the first connection port 44 is mounted. As illustrated in FIG. 6, each of the first bulged portions 67a and 67b is wider than each of the first support portions 61a and 61b. In other words, in a plan view, a maximum width W1 of the first bulged portions 67a and 67b is greater than a width W0 of the first support portions 61a and 61b in the first direction perpendicular to the longitudinal direction of the first exhaust treatment device 41. Accordingly, even if the first exhaust treatment device 41 is formed by coupling a plurality of cylindrical members to each other by means of clamps, the clamps do not contact the bottom surface of the main body part 60.

As illustrated in FIG. 9, the second bulged portion 67c illustrated in FIGS. 6, 7 and 9 is further downwardly bulged than the second support portions 62a and 62b in locations positioned under the second exhaust treatment device 42. The second bulged portion 67c is provided between the second support portion 62a and the second support portion 62b. As illustrated in FIG. 6, the second bulged portion 67c is wider than the second support portions 62a and 62b.

The rib 68 illustrated in FIGS. 6, 7, 10 and 11 is provided between the first bulged portion 67a and the second bulged portion 67c. As illustrated in FIGS. 10 and 11, the rib 68 protrudes further upwardly than the third attachment portions 65a and 65c, while being obliquely slanted from the second bulged portion 67c towards the first bulged portion 67a. The rib 68 can strengthen the part between the first bulged portion 67a and the second bulged portion 67c.

The first hole portion 69 illustrated in FIGS. 6, 7 and 11 allows the first connection port 44 to be inserted therethrough. As illustrated in FIGS. 3 and 5, the first connection port 44 extends obliquely downwards. Therefore, the first hole portion 69 is positioned closer to the second attachment portion 64b than to the middle of the second attachment portions 64a and 64b. It should be noted that the first connection port 44 may extend downwards, while the first hole portion 69 may be positioned in the middle of the second attachment portions 64a and 64b.

The second hole portions 70a, 70b, 70c and 70d illustrated in FIGS. 6 and 7 are hole for dropping foreign objects such as withered leaves. The second hole portions 70a to 70d are provided in the first bulged portions 67a and 67b and the second bulged portion 67c. In other words, the second hole portions 70a to 70d are provided in at least either of the first bulged portions 67a and 67b and the second bulged portion 67c.

The third hole portion 70e illustrated in FIGS. 6 to 8 is also a hole for dropping foreign objects such as withered leaves. The third hole portion 70e is provided across the lateral surface and the bottom surface of the main body part 60. The fourth hole portion 70f illustrated in FIGS. 6, 7 and 11 is an hole for allowing a tube (not illustrated in the figures) connected to the bottom part of the second exhaust treatment device 42 to be inserted therethrough. Water accumulated in the second exhaust treatment device 42 is discharged through the tube. The fifth hole portions 70g and 70h illustrated in FIGS. 6, 7 and 11 are holes for draining water accumulated on the first bracket 43 due to rain and so forth.

As illustrated in FIGS. 6, 7 and 9, the cut-out portion 71 is formed in the main body part 60 and the brim part 72. As illustrated in FIGS. 3 to 5, the cut-out portion 71 is provided adjacent to the second support portions 62a and 62b when the second exhaust treatment device 42 is disposed closer to the engine 21 than the first exhaust treatment device 41. Contrarily, the cut-out portion 71 is preferably provided adjacently to the first support portions 61a and 61b when the first exhaust treatment device 41 is disposed closer to the engine 21 than the second exhaust treatment device 42. As illustrated in FIG. 4, the cut-out portion 71 is positioned over a cylinder head 21a of the engine 21. Therefore, the cylinder head 21a of the engine 21 is accessible from above through the cut-out portion 71. Therefore, a maintenance work for the engine 21 can be performed without detaching the exhaust treatment unit 24 from the work vehicle 100.

Attachment of First Bracket and Second Bracket

Figure 12:
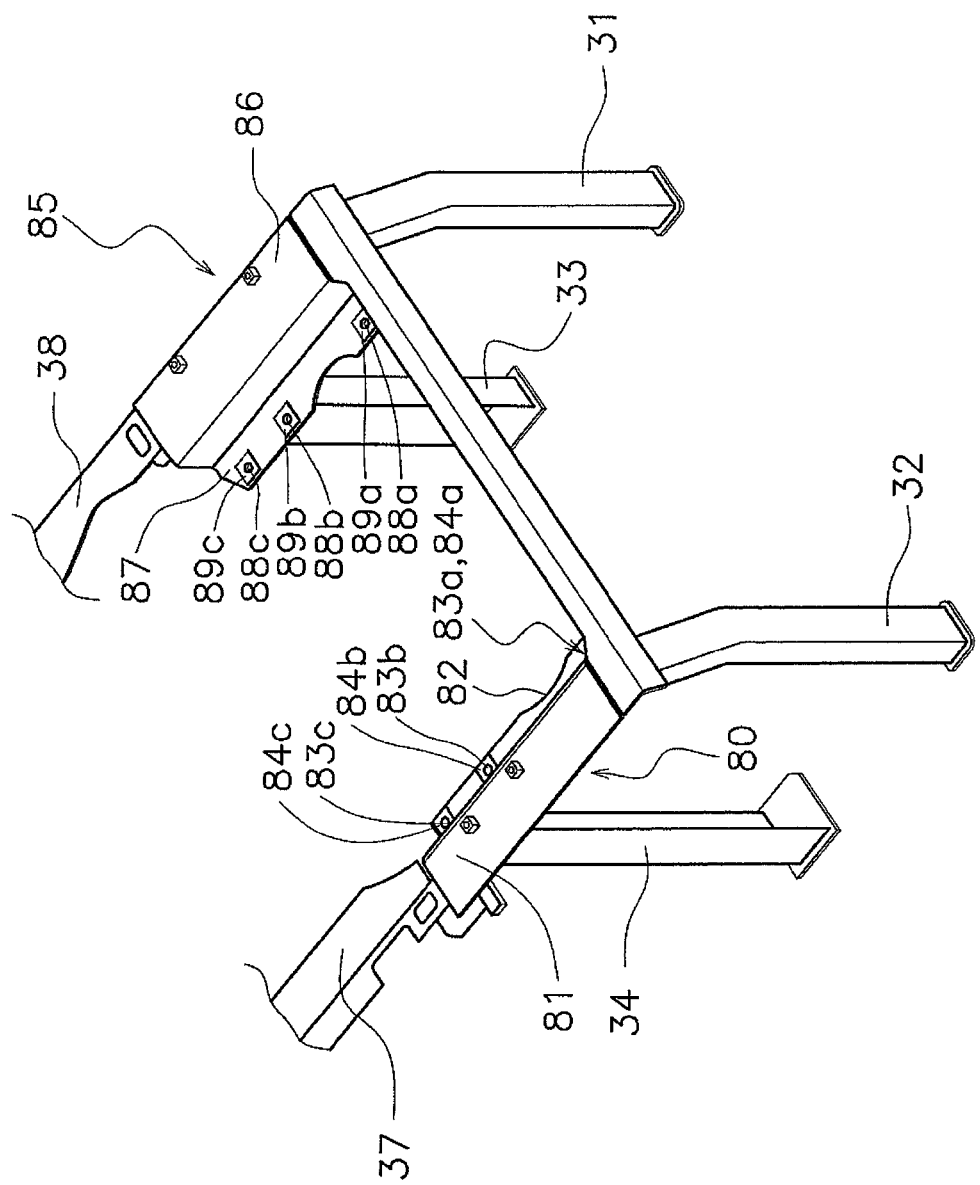
FIG. 12 is a perspective view of a second bracket attached to a beam member.
Figure 13:
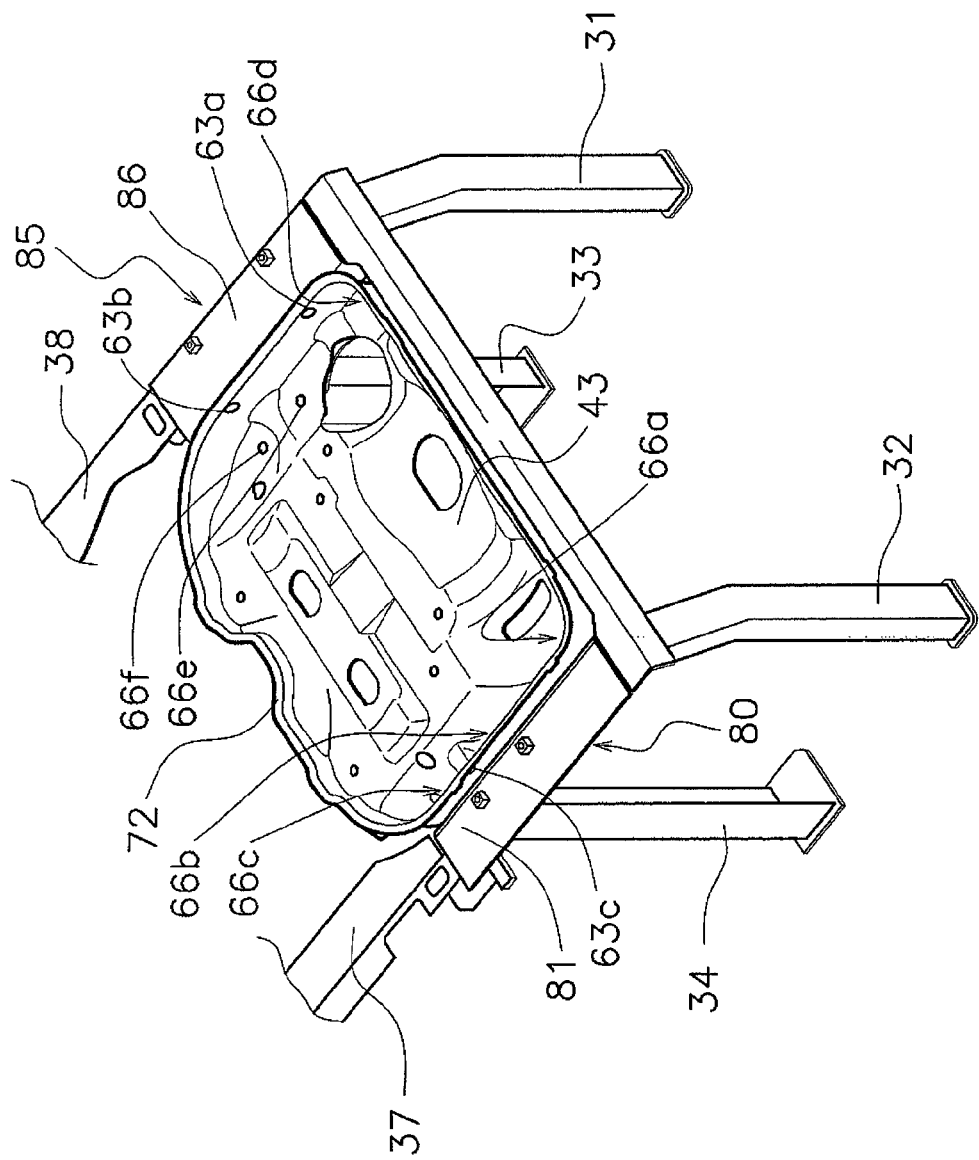
FIG. 13 is a perspective view of the first bracket attached to the second bracket illustrated in FIG. 12.

Next, explanation will be made for a method of attaching the first bracket 43 and the second brackets 80 and 85 to the vehicle body frame 27. FIG. 12 is a perspective view of the second brackets 80 and 85 attached to the beam members 37 and 38. FIG. 13 is a perspective view of the first bracket 43 attached to the second brackets 80 and 85 illustrated in FIG. 12.

With reference to FIG. 12, the second bracket 80 includes a first upper portion 81 and a first lower portion 82. The second bracket 85 includes a second upper portion 86 and a second lower portion 87. The first upper portion 81 is positioned above the first lower portion 82. The second upper portion 86 is positioned above the second lower portion 87. The first upper portion 81, the first lower portion 82, the second upper portion 86 and the second lower portion 87 are planer plate members. Surfaces formed by the first upper portion 81, the first lower portion 82, the second upper portion 86 and the second lower portion 87 are all horizontally disposed. Further, the first upper portion 81 and the second upper portion 86 are disposed on the same plane, while the first lower portion 82 and the second lower portion 87 are disposed on the same plane.

The first upper portion 81 is fixed to the first beam member 37 by means of bolts and nuts. Likewise, the second upper portion 86 is fixed to the second beam member 38 by means of bolts and nuts. Thus, the second brackets 80 and 85 are respectively fixed to the beam members 37 and 38. It should be noted that the first upper portion 81 may be fixed to the first beam member 37 while the second upper portion 86 may be fixed to the second beam member 38, not necessarily by means of the aforementioned fixing method but by means of, for instance, welding. It should be noted that in the following explanation, the first upper portion 81 and the second upper portion 86 will be referred to also as sixth attachment portions.

The first lower portion 82 includes fifth attachment portions 83a, 83b and 83c. As illustrated in FIGS. 12 and 13, the fifth attachment portions 83a to 83c are positioned correspondingly to the fourth attachment portions 66a to 66c of the first bracket 43. The second lower portion 87 includes fifth attachment portions 88a, 88b and 88c. As illustrated in FIGS. 12 and 13, the fifth attachment portions 88a to 88c are positioned correspondingly to the fourth attachment portions 66d to 66f of the first bracket 43. As illustrated in FIG. 13, the first bracket 43 is attached to the fifth attachment portions 83a to 83c and 88a to 88c. As illustrated in FIG. 5, in the present exemplary embodiment, the first bracket 43 is attached to the second brackets 80 and 85 by means of bolts and nuts. Therefore, the fourth attachment portions 66a to 66f and the fifth attachment portions 83a to 83c and 88a to 88c respectively include holes. However, when other fixing means such as latches are employed, the fourth attachment portions 66a to 66f and the fifth attachment portions 83a to 83c and 88a to 88c may be formed in other shapes or may include members such as hooks.

To secure flat surfaces, plates 84a to 84c and 89a to 89c are disposed immediately on the fifth attachment portions 83a to 83c and 88a to 88c. For example, steel materials are used for the plates 84a to 84c and 89a to 89c. As illustrated in FIGS. 5 and 9, the third reinforcement plates 78 and 79 are disposed immediately on the plates 84a to 84c and 89a to 89c. Steel materials are used for the third reinforcement plates 78 and 79. As illustrated in FIG. 9, the fourth attachment portions 66a to 66f are disposed immediately on the third reinforcement plates 78 and 79. The plates 84a to 84c and 89a to 89c and the third reinforcement plates 78 and 79 respectively include holes corresponding to the fourth attachment portions 66a to 66f and the fifth attachment portions 83a to 83c and 88a to 88c. As described above, the plates 84a to 84c and 89a to 89c and the third reinforcement plates 78 and 79 are mounted between the fourth attachment portions 66a to 66f and the fifth attachment portions 83a to 83c and 88a to 88c. Accordingly, required strength can be reliably obtained for the attachment portions between the first bracket 43 and the second brackets 80 and 85. Variation in position of the exhaust treatment device can be also suppressed. Further, the first bracket 43 and the second brackets 80 and 85 are attachable to and detachable from each other. Therefore, the exhaust treatment unit 24 is attachable to and detachable from the vehicle body frame 27.

As illustrated in FIGS. 3 and 13, where the first bracket 43 is attached to the second brackets 80 and 85, the brim part 72 is positioned above the beam members 37 and 38. Further, the first attachment portions 63a to 63c are also positioned above the beam members 37 and 38. In other words, the brim part 72 is positioned above the first upper portion 81 and the second upper portion 86 (the sixth attachment portions). Further, the attachment portions 63a to 63c are also positioned above the first upper portion 81 and the second upper portion 86 (the sixth attachment portions).

As illustrated in FIG. 5, while the first bracket 43 is attached to the second brackets 80 and 85, the first lower portion 82 and the second lower portion 87 are positioned below the beam members 37 and 38. In other words, the fifth attachment portions 83a to 83c and 88a to 88c are positioned below the beam members 37 and 38.

Manufacturing Method of Exhaust Treatment Unit

Figure 14:
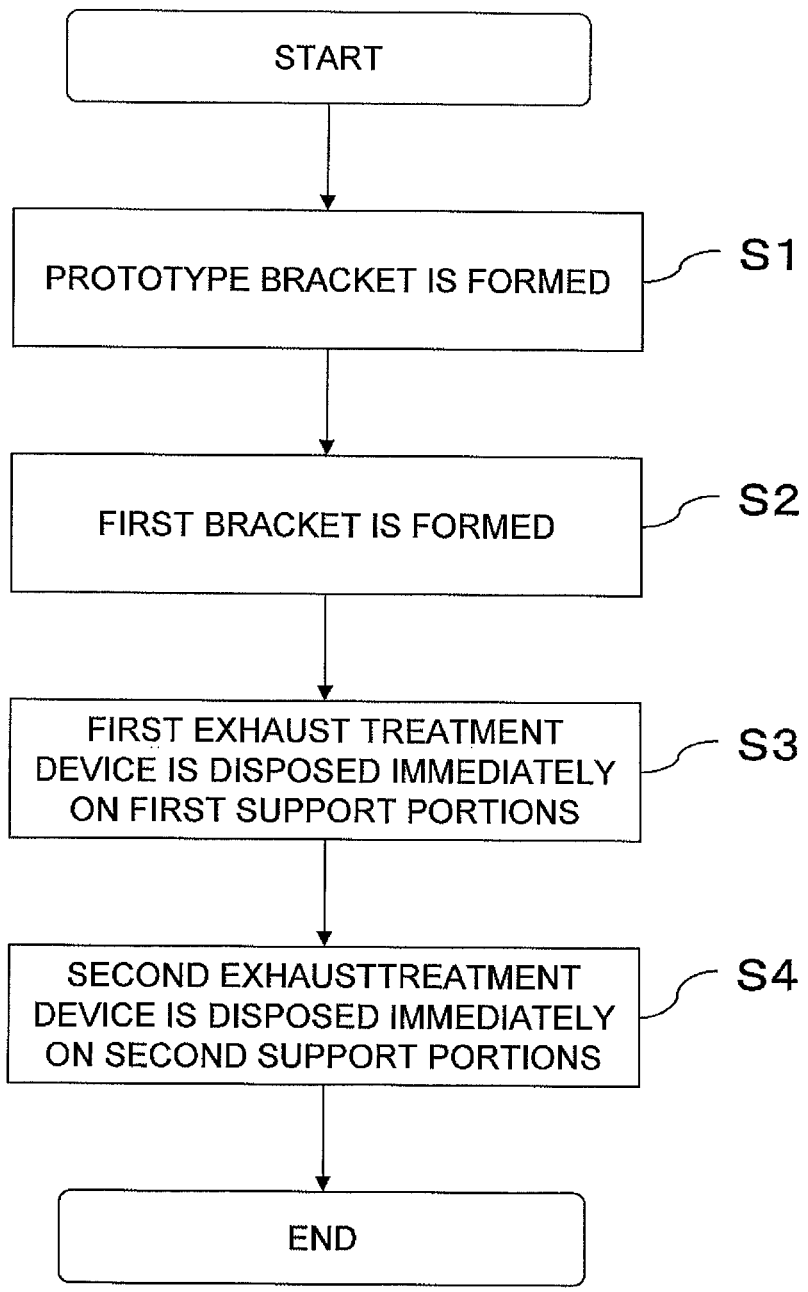
FIG. 14 is a flowchart of a manufacturing method of the exhaust treatment unit according to the present exemplary embodiment.

Next, explanation will be made for a manufacturing method of the exhaust treatment unit 24 according to the present exemplary embodiment. FIG. 14 is a flowchart of the manufacturing method of the exhaust treatment unit 24 according to the present exemplary embodiment.

Figure 15:
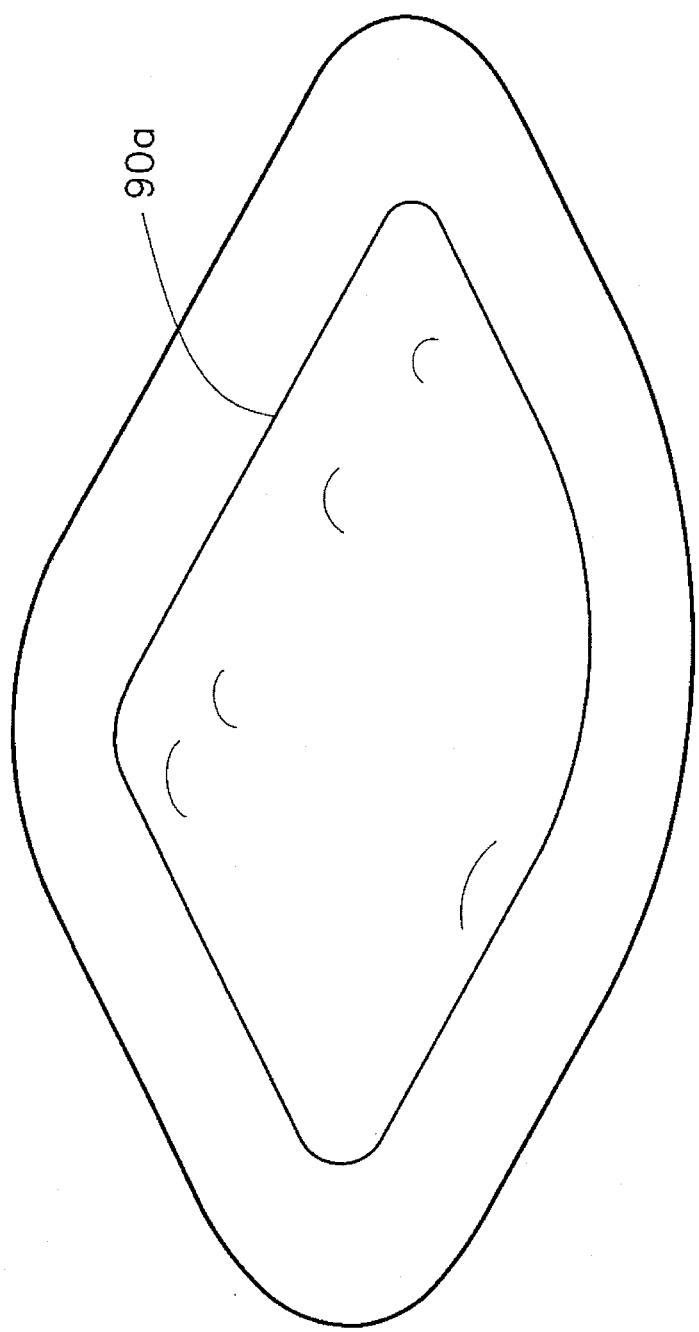
FIG. 15 illustrates a schematic shape of a plate member to be produced in a first stamping step.
Figure 16:
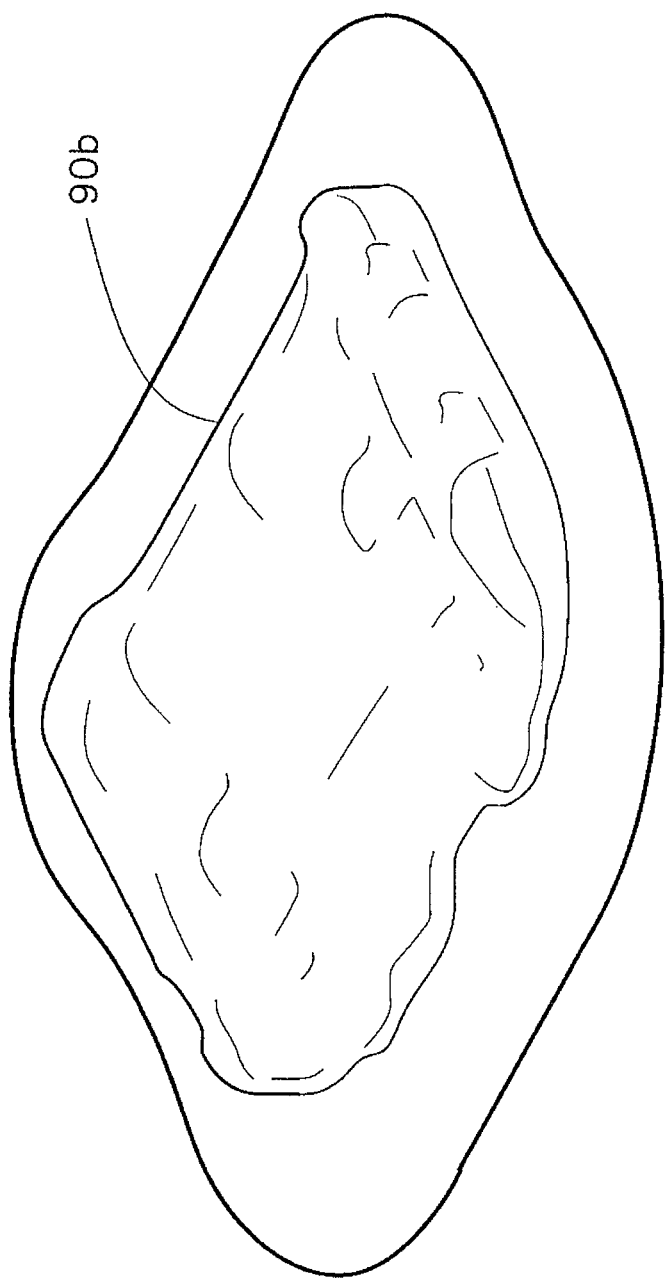
FIG. 16 illustrates a schematic shape of the plate member to be produced in a second stamping step.
Figure 17:
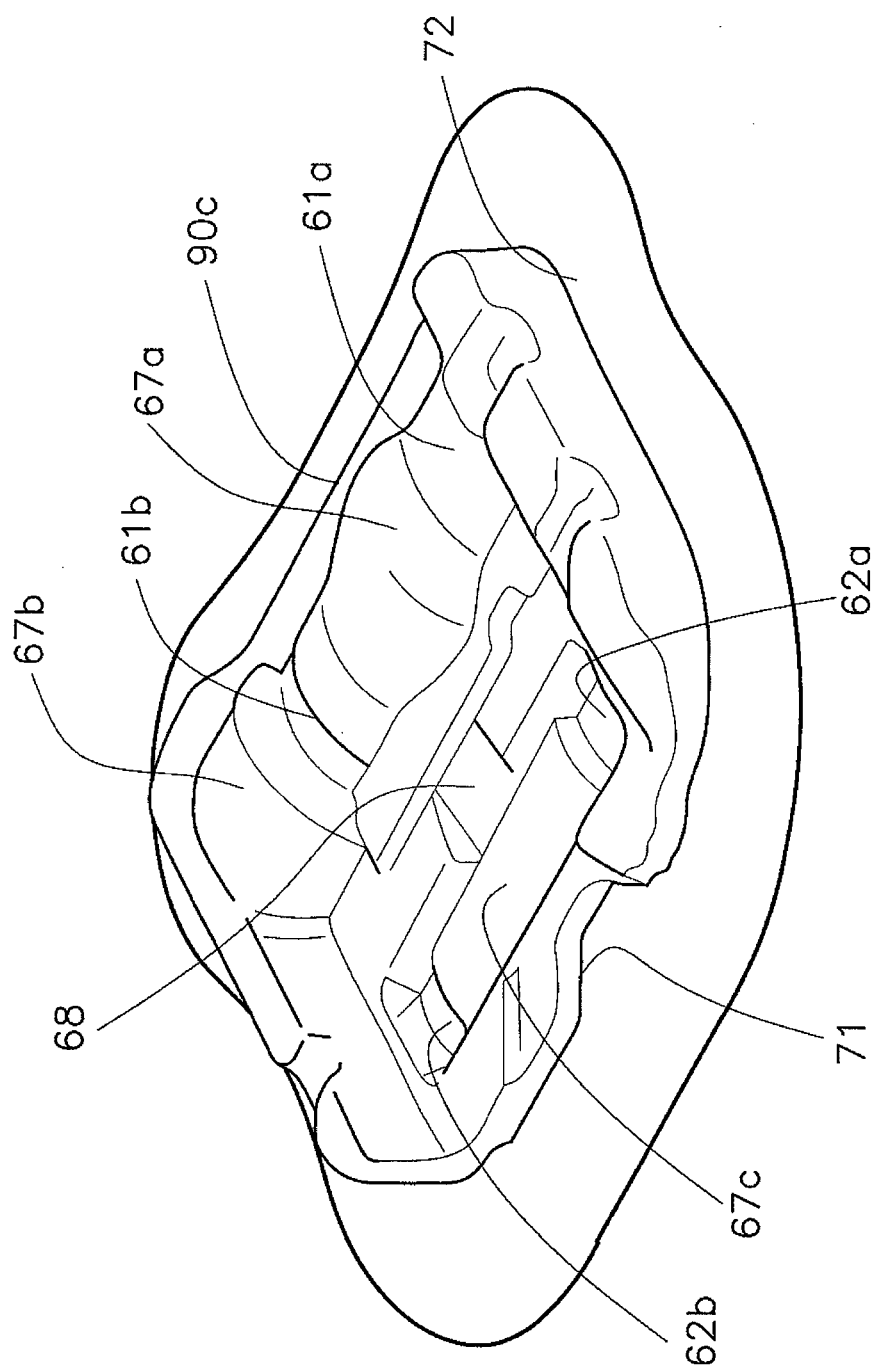
FIG. 17 illustrates a schematic shape of the plate member to be produced in a third stamping step.

In Step S1, a prototype bracket is formed by means of stamping of a single plate member. The prototype bracket is produced in three stamping steps. FIG. 15 illustrates a schematic shape of the plate member to be produced in the first stamping step. As illustrated in FIG. 15, a plate member 90a formed as the main body part 60 is pressed in the first stamping. FIG. 16 illustrates a schematic shape of a plate member to be produced in the second stamping step. As illustrated in FIG. 16, a plate member 90b, on which the first bulged portions 67a and 67b and a part of the second bulged portion 67c are formed, is produced in the second stamping. FIG. 17 illustrates a schematic shape of a plate member to be produced in the third stamping step. As illustrated in FIG. 17, a prototype bracket 90c to be produced in the third stamping step includes the first support portions 61a and 61b, the second support portions 62a and 62b, the first bulged portions 67a and 67b, the second bulged portion 67c, the rib 68, the cut-out portion 71 and the brim part 72. In other words, the prototype bracket 90c includes the brim part 72 and the main body part 60 that has a convex shape downwardly bulged from the brim part 72 and includes the first support portions 61a and 61b and the second support portions 62a and 62b.

In Step S2, a part of the plate member, surrounding the brim part 72, is cut out from the prototype bracket 90c. Then, the first to fourth attachment portions, the first hole portion and the second hole portions are formed in a perforating step. Thus, the first bracket 43 is formed.

In Step S3, the first exhaust treatment device 41 is disposed immediately on the first support portions 61a and 61b. At this time, the first U-shaped bolts 95a and 95b and the first reinforcement plates 73 to 75 may be attached.

In Step S4, the second exhaust treatment device 42 is disposed immediately on the second support portions 62a and 62b. At this time, the second U-shaped bolts 96a and 96b and the second reinforcement plates 76 and 77 may be attached.

It should be noted that a step of connecting the second connection pipe 52 to both of the first exhaust treatment device 41 and the second exhaust treatment device 42, a step of attaching the first bracket 43 to the second brackets 80 and 85, and a step of connecting the first connection pipe 51 to the first exhaust treatment device 41 may be included as the subsequent steps.

Features

The exhaust treatment unit 24 according to the present exemplary embodiment has the following features.

(1) The first support portions 61a and 61b for directly supporting the first exhaust treatment device 41 and the second support portions 62a and 62b for directly supporting the second exhaust treatment device 42 are integrally formed with the first bracket 43. Therefore, the exhaust treatment unit 24 can stably support the first exhaust treatment device 41 and the second exhaust treatment device 42 with a small number of components.

(2) The first attachment portions 63a to 63c are provided on the lateral surface of the main body part 60 of the first bracket 43. Therefore, the entirety of the exhaust treatment unit 24 can be detached by means of hoist hooks. Thus, the maintenance work of the exhaust treatment unit 24 can be facilitated.

(3) The first bulged portions 67a and 67b are bulged further downwards than the first support portions 61a and 61b, whereas the second bulged portion 67c is bulged further downwards than the second support portions 62a and 62b. Therefore, components can be attached to the surroundings of the first exhaust treatment device 41 and the second exhaust treatment device 42.

(4) The rib 68 is formed between the first bulged portion 67a and the second bulged portion 67c. Therefore, the part between the first bulged portion 67a and the second bulged portion 67c can be enhanced in its strength.

(5) The first support portions 61a and 61b are positioned below the second support portions 62a and 62b. Therefore, the bottom part of the first exhaust treatment device 41 is positioned below the beam members 37 and 38 supporting the exhaust treatment unit 24. Accordingly, the height of the exhaust treatment unit can be lowered, and enlargement of the work vehicle can be suppressed. In other words, the height of the engine hood can be suppressed.

(6) The second connection pipe 52 is disposed over the first exhaust treatment device 41 and the second exhaust treatment device 42. As a result, the second connection pipe 52 can be easily detached from the exhaust treatment unit 24 by upwardly hoisting the second connection pipe 52.

(7) The first support portions 61a and 61b and the second support portions 62a and 62b respectively include contact surfaces fitted to the outer peripheral surface of the first exhaust treatment device 41 and that of the second exhaust treatment device 42. Therefore, the first exhaust treatment device 41 and the second exhaust treatment device 42 are stably supported by the first support portions 61a and 61b and the second support portions 62a and 62b, respectively.

(8) The first exhaust treatment device 41 and the second exhaust treatment device 42 have cylindrical shapes, whereas the first support portions 61a and 61b and the second support portions 62a and 62b are formed in circular-arc cross-sectional shapes. Therefore, the first exhaust treatment device 41 can be mounted to the first support portions 61a and 61b independently of variation in posture of the first exhaust treatment device 41 attributed to the rotation of the first exhaust treatment device 41 around the center axis Ax1. Likewise, the second exhaust treatment device 42 can be mounted to the second support portions 62a and 62b independently of variation in posture of the second exhaust treatment device 42 attributed to the rotation of the second exhaust treatment device 42 about the center axis Ax2. Therefore, installation works for the first exhaust treatment device 41 and the second exhaust treatment device 42 can be facilitated.

(9) The second attachment portions 64a and 64b are provided on the both sides of the first support portion 61a in the direction perpendicular to the center axis Ax1 of the first exhaust treatment device 41. Likewise, the second attachment portion 64c and 64d are provided on the both sides of the first support portion 61b in the direction perpendicular to the center axis Ax1 of the first exhaust treatment device 41. Further, the first U-shaped bolts 95a and 95b are attached to the second attachment portions 64a to 64d. Contact area is thereby increased between the first U-shaped bolts 95a and 95b and the first exhaust treatment device 41. Accordingly, the first exhaust treatment device 41 is stably fixed.

(10) The third attachment portions 65a and 65b are provided on the both sides of the second support portion 62a in the direction perpendicular to the center axis Ax2 of the second exhaust treatment device 42. Likewise, the third attachment portions 65c and 65d are provided on the both sides of the second support portion 62b in the direction perpendicular to the center axis Ax2 of the second exhaust treatment device 42. Further, the second U-shaped bolts 96a and 96b are attached to the third attachment portions 65a to 65d. Contact area is thereby increased between the second U-shaped bolts 96a and 96b and the second exhaust treatment device 42. Accordingly, the second exhaust treatment device 42 is stably fixed.

(11) The first reinforcement plates 73 to 75, receiving axial force to be produced in tightening the bolts and the nuts, are attached to the second attachment portions 64a to 64d. Accordingly, it is possible to suppress deformation of the second attachment portions 64a to 64d attributed to vibration of the work vehicle 100 or the aforementioned axial force.

(12) The second reinforcement plates 76 and 77, receiving axial force to be produced in tightening the bolts and the nuts, are attached to the third attachment portions 65a to 65d. Accordingly, it is possible to suppress deformation of the third attachment portions 65a to 65d attributed to vibration of the work vehicle 100 or the aforementioned axial force.

(13) The first exhaust treatment device 41 includes the first connection port 44, and the first connection port 44 is inserted through the first hole portion 69 of the main body part 60. Therefore, the work of connecting or disconnecting the first exhaust treatment device 41 and the first connection pipe 51 can be facilitated in the maintenance of the exhaust treatment unit 24. Accordingly, the maintenance performance of the first exhaust treatment device 41 can be further enhanced.

(14) At least either of the first bulged portions 67a and 67b and the second bulged portion 67c include/includes the second hole portions 70a and 70b and/or the second hole portions 70c and 70d. Therefore, when a foreign object drops on the exhaust treatment unit 24, the foreign object can be discharged from the exhaust treatment unit 24.

(15) The maximum width W1 of the first bulged portions 67a and 67b in the first direction perpendicular to the longitudinal direction of the first exhaust treatment device 41 is greater than the width of the first support portions 61a and 61b in the first direction. Accordingly, even when the first exhaust treatment device 41 is formed by a plurality of cylindrical members coupled to each other by means of clamps, the clamps do not contact the bottom surface of the main body part 60.

Further, the work vehicle equipped with the exhaust treatment unit 24 according to the present exemplary embodiment has the following features.

(16) The exhaust treatment unit 24 is supported by the second brackets 80 and 85 attached to the beam members 37 and 38. Accordingly, the exhaust treatment unit 24 can be disposed at an arbitrary height with reference to the beam members 37 and 38. Therefore, the exhaust treatment unit 24 can be disposed at the optimal height in accordance with the height of the hydraulic pump 23.

(17) The fifth attachment portions 83a to 83c and 88a to 88c of the second brackets 80 and 85 are positioned below the beam members 37 and 38. Therefore, the bottom part of the first exhaust treatment device 41 is positioned below the beam members 37 and 38 supporting the exhaust treatment unit 24. Accordingly, the height of the exhaust treatment unit 24 can be lowered, and enlargement of the work vehicle can be suppressed. In other words, the height of the engine hood can be suppressed.

(18) The sixth attachment portions 81 and 86 of the second brackets 80 and 85 are positioned above the fifth attachment portions 83a to 83c and 88a to 88c. In other words, the fifth attachment portions 83a to 83c and 88a to 88c are positioned below the sixth attachment portions 81 and 86. Therefore, the bottom part of the first bracket 43 is positioned below the second brackets 80 and 85. Accordingly, the height of the exhaust treatment unit 24 can be lowered, and enlargement of the work vehicle can be suppressed. In other words, the height of the engine hood can be suppressed.

(19) The first attachment portions 63a to 63c are positioned above the beam members 37 and 38, while the first bracket 43 is attached to the second brackets 80 and 85. Further, the first attachment portions 63a to 63c are positioned above the sixth attachment portions 81 and 86, while the first bracket 43 is attached to the second brackets 80 and 85. Therefore, in attaching the hoist hooks to the first attachment portions 63a to 63c, the beam members 37 and 38 and the second brackets 80 and 85 do not interfere with the hoist hooks. Consequently, the attachment work and the detachment work of the exhaust treatment unit 24 can be thereby facilitated.

(20) The third reinforcement plates 78 and 79, receiving axial force to be produced in tightening the bolts and the nuts, are disposed between the fourth attachment portions 66a to 66f and the fifth attachment portions 83a to 83c and 88a to 88c. Therefore, it is possible to suppress deformation of the fourth attachment portions 66a to 66f attributed to vibration of the work vehicle 100 or the aforementioned axial force.

(21) The first connection pipe 51 extends roughly in parallel to the plane P including the center axis Ax1 of the first exhaust treatment device 41 and the center axis Ax2 of the second exhaust treatment device 42. Therefore, the first connection pipe 51 is obliquely disposed, and accordingly, a suitable length of the bellows part 54 can be secured. Consequently, the engine 21 and the diesel particulate filter device 41 can be further easily connected to each other.

Modifications

The exemplary embodiment of the present invention has been explained above. However, the present invention is not limited to the aforementioned exemplary embodiment, and a variety of changes can be made without departing from the scope of the present invention.

In the aforementioned exemplary embodiment, explanation has been made for the example of applying the exhaust treatment unit 24 to the hydraulic excavator. However, the exhaust treatment unit 24 may be applied to another work vehicle such as a bulldozer.

The second exhaust treatment device 42 may be disposed below the beam members 37 and 38. It should be noted that the second exhaust treatment device 42 is preferably disposed above the first exhaust treatment device 41.

The shape of the first exhaust treatment device 41 and that of the second exhaust treatment device 42 may not be limited to cylindrical shapes or the like, and may be other shapes such as an elliptic cylindrical shape and/or a rectangular parallelepiped shape.

The first direction may not be limited to the vehicle width direction, and may be another direction. In other words, the first exhaust treatment device 41 and the second exhaust treatment device 42 may be disposed in alignment with each other in a direction different from the vehicle width direction. For example, the first direction may be the vehicle back-and-forth direction. In other words, the first exhaust treatment device 41 and the second exhaust treatment device 42 may be disposed in alignment with each other in the vehicle back-and-forth direction.

The first exhaust treatment device 41 may be supported by any of the column members 31 to 36. The second exhaust treatment device 42 may be supported by any of the column members 31 to 36. The vehicle body frame 27, supporting the first exhaust treatment device 41 and the second exhaust treatment device 42, may not be limited to a component supporting the exterior cover 28. For example, a dedicated vehicle body frame configured to support the first exhaust treatment device 41 and the second exhaust treatment device 42 may be provided.

The number of the first support portions 61a and 61b, that of the second support portions 62a and 62b, that of the first U-shaped bolts 95a and 95b and that of the second U-shaped bolts 96a and 96b may not be respectively limited to two, and may be either one or three or more. In correspondence with the configuration, the number of the second attachment portions 64a to 64d and that of the third attachment portions 65a to 65d may be changed. Similarly, the number and so forth of the first attachment portions 63a to 63c, those of the fourth attachment portions 66a to 66f and those of the fifth attachment portions 83a to 83c and 88a to 88c may be arbitrarily changed. Further, the first bracket 43 may not include at least one of: the first bulged portions 67a and 67b; the second bulged portion 67c; the rib 68; the first hole portion 69; the second hole portions 70a, 70b, 70c and 70d; and the cut-out portion 71.

In the aforementioned explanation, the second brackets 80 and 85 are composed of two different members. However, the second brackets 80 and 85 may be integrally formed. Further, the plates 84a to 84c and 89a to 89c and/or the first to third reinforcement plates 73 to 79 may not be used.

According to the present invention, it is possible to provide an exhaust treatment unit and a work vehicle whereby a diesel particulate filter device and a selective catalytic reduction device can be stably supported with a small number of components.

The invention claimed is:

1. An exhaust treatment unit for treating exhaust gas from an engine of a work vehicle, the exhaust treating unit comprising:
a first exhaust treatment device;
a second exhaust treatment device; and
a first bracket, the first exhaust treatment device and the second exhaust treatment device being attached to the first bracket, the first bracket including
a brim part, and
a main body part having a convex shape downwardly bulged from the brim part, the main body part including
a first support portion directly supporting the first exhaust treatment device, and
a second support portion directly supporting the second exhaust treatment device.

2. The exhaust treatment unit according to claim 1, wherein the main body part further includes a first attachment portion on a lateral surface thereof, and the first attachment portion is configured to allow a hoist hook to be attached thereto.

3. The exhaust treatment unit according to claim 2, wherein the main body part further includes
a first bulged portion bulged further downward than the first support portion in a position located under the first exhaust treatment device, and
a second bulged portion bulged further downward than the second support portion in a position located under the second exhaust treatment device.

4. The exhaust treatment unit according to claim 3, wherein the main body part further includes a rib upwardly between the first bulged portion and the second bulged portion.

5. The exhaust treatment unit according to claim 1, wherein the first support portion is positioned below the second support portion.

6. The exhaust treatment unit according to claim 5, further comprising:
a relay connection pipe connecting the first exhaust treatment device and the second exhaust treatment device,
the relay connection pipe being disposed above the first exhaust treatment device and the second exhaust treatment device.

7. The exhaust treatment unit according to claim 6, wherein the first support portion includes a contact surface fitted to an outer peripheral surface of the first exhaust treatment device, and
the second support portion includes a contact surface fitted to an outer peripheral surface of the second exhaust treatment device.

8. The exhaust treatment unit according to claim 7, wherein the first exhaust treatment device and the second exhaust treatment device have cylindrical shapes, and the first support portion and the second support portion have arc-shaped cross-sections.

9. The exhaust treatment unit according to claim 8, further comprising:
a first U-shaped bolt locking the first exhaust treatment device,
the main body part further includes a second attachment portion, the first U-shaped bolt being attached to the second attachment portion, and the second attachment portion being provided on both sides of the first support portion in a direction perpendicular to a center axis of the first exhaust treatment device.

10. The exhaust treatment unit according to claim 7, further comprising:
a second U-shaped bolt locking the second exhaust treatment device,
the main body part further includes a third attachment portion, the second U-shaped bolt being attached to the third attachment portion, and the third attachment portion being provided on both sides of the second support portion in a direction perpendicular to a center axis of the second exhaust treatment device.

11. The exhaust treatment unit according to claim 5, wherein
the first exhaust treatment device includes a connection port extending downwardly in a tubular shape, and
the main body part further includes a first hole portion with the connection port inserted through the first hole.

12. The exhaust treatment unit according to claim 3, wherein
the main body part further includes a second hole portion formed in at least one of the first bulged portion and the second bulged portion, and the second hole portion is configured to drop a foreign object therethrough.

13. The exhaust treatment unit according to claim 3, wherein
in a plan view, a maximum width of the first bulged portion in a first direction perpendicular to a longitudinal direction of the first exhaust treatment device is greater than a width of the first support portion in the first direction.

14. A work vehicle, comprising:
an engine;
a vehicle body frame including
a plurality of column members mounted upright onto a revolving frame supporting the engine, and
a beam member mounted onto upper ends of the column members;
a first exhaust treatment device configured to treat exhaust gas from the engine;
a second exhaust treatment device configured to treat the exhaust gas from the engine;
a first bracket, the first exhaust treatment device and the second exhaust treatment device being attached to the first bracket, the first bracket including
a brim part, and
a main body part having a convex shape downwardly bulged from the brim part, the main body part including
a first support portion directly supporting the first exhaust treatment device,
a second support portion directly supporting the second exhaust treatment device, and
a fourth attachment portion; and
a second bracket supporting the first bracket, the second bracket being attached to the fourth attachment portion, the second bracket including a fifth attachment portion, the first bracket being attached to the fifth attachment portion, and a sixth attachment portion attached to the beam member.

15. The work vehicle according to claim 14, wherein the fifth attachment portion is positioned below the beam member.

16. The work vehicle according to claim 15, wherein the sixth attachment portion is positioned above the fifth attachment portion.

17. The work vehicle according to claim 14, wherein the main body part further includes a first attachment portion on a lateral surface thereof, and the first attachment portion is configured to allow a hoist hook to be attached thereto, and the first attachment portion is positioned above the beam member while the first bracket is attached to the second bracket.

18. The work vehicle according to claim 17, wherein the first attachment portion is positioned above the sixth attachment portion while the first bracket is attached to the second bracket.

19. The work vehicle according to claim 14, further comprising:

a connection pipe connecting the engine and the first exhaust treatment device, the first exhaust treatment device and the second exhaust treatment device having cylindrical shapes, and the connection pipe extending in parallel to a plane including a center axis of the first exhaust treatment device and a center axis of the second exhaust treatment device.

20. An exhaust treatment unit for treating exhaust gas from an engine of a work vehicle, the exhaust treating unit comprising:

a first bracket formed by a first step of forming a prototype bracket by stamping of a single plate member, the prototype bracket including a brim part and a main body part, the main body part having a convex shape downwardly bulged from the brim part, a first support portion, and a second support portion, and a second step of cutting out a surrounding part of the brim part from the prototype bracket;

a first exhaust treatment device disposed immediately on the first support portion; and a second exhaust treatment device disposed immediately on the second support portion.

* * * * *